United States Patent
Fujieda et al.

(10) Patent No.: US 9,342,263 B2
(45) Date of Patent: May 17, 2016

(54) INFORMATION PROCESSING APPARATUS, METHOD, AND PROGRAM CREATING RENDERING DATA USING A SETTING INFORMATION SET CONVERTED ACCORDING TO A SELECTED SCHEME

(71) Applicants: Takayuki Fujieda, Tokyo (JP); Yosuke Aoki, Kanagawa (JP)

(72) Inventors: Takayuki Fujieda, Tokyo (JP); Yosuke Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/611,960

(22) Filed: Feb. 2, 2015

(65) Prior Publication Data

US 2015/0220288 A1    Aug. 6, 2015

(30) Foreign Application Priority Data

Feb. 5, 2014  (JP) ................................ 2014-020232
Feb. 2, 2015  (JP) ................................ 2015-018135

(51) Int. Cl.
*G06F 3/12*     (2006.01)

(52) U.S. Cl.
CPC ............ *G06F 3/1275* (2013.01); *G06F 3/1208* (2013.01); *G06F 3/1227* (2013.01); *G06F 3/1246* (2013.01); *G06F 3/1253* (2013.01); *G06F 3/1247* (2013.01)

(58) Field of Classification Search
None
See application file for complete search history.

(56) References Cited

U.S. PATENT DOCUMENTS

| 8,400,654 | B2* | 3/2013 | Yamada | G06F 3/1208 358/1.13 |
| 8,508,768 | B2* | 8/2013 | Sekine | G06Q 10/10 358/1.1 |
| 8,659,772 | B2* | 2/2014 | Nakagawa | G06F 3/1208 358/1.13 |
| 2009/0279125 | A1 | 11/2009 | Liu et al. | |
| 2012/0287463 | A1 | 11/2012 | Iida | |
| 2015/0205554 | A1* | 7/2015 | Shibata | G06F 3/1257 358/1.15 |

FOREIGN PATENT DOCUMENTS

| JP | 2009-271930 | 11/2009 |
| JP | 2012-238188 | 12/2012 |
| JP | 2013-088992 | 5/2013 |

* cited by examiner

*Primary Examiner* — Paul F Payer
(74) *Attorney, Agent, or Firm* — Duft Bornsen & Fettig LLP

(57) ABSTRACT

An information processing apparatus which creates rendering data using a print job including print data and a setting information set is disclosed, including a conversion unit which converts the setting information set to an apparatus setting information set by multiple schemes, the apparatus setting information set to be handled by the information processing apparatus; an evaluation value determination unit which determines an evaluation value of the apparatus setting information set for the respective schemes based on results of comparing the setting information set and the apparatus setting information set; and a rendering data creation unit which creates rendering data using the printing data and the apparatus setting information set converted by the scheme with the evaluation value higher than the other evaluation values.

10 Claims, 26 Drawing Sheets

FIG.6A

```
<JDF xmlns="http://www.CIP4.org/JDFSchema_1_1" xmlns:C="www.ccc.com/schema/ccc" ...>
  ...
  <ResourceLinkPool>
    <ComponentLink ... Amount = "2" ... />
  </ResourceLinkPool>
  <ResourcePool>
    <LayoutPreparationParams ... Rotate = "Rotate90" ... >
    ...
    </LayoutPreparationParams>
  </ResourcePool>
</JDF>
```

FIG.6B

```
<JDF xmlns="http://www.CIP4.org/JDFSchema_1_1" xmlns:A="www.aaa.com/schema/aaa" ...>
  ...
  <ResourceLinkPool>
    <ComponentLink ... A:Amount = "2" ... />
  </ResourceLinkPool>
  <ResourcePool>
    <LayoutPreparationParams ... A:Rotate = "1" ... >
    ...
    </LayoutPreparationParams>
  </ResourcePool>
</JDF>
```

```
<JDFxmlns="http://www.CIP4.org/JDFSchema_1_1" xmlns:B="www.bbb.com/schema/bbb" ...>
 <ResourceLinkPool>
   ...
   <ComponentLink ... B:DeliveryAmount = "2" ... />
 </ResourceLinkPool>
 <ResourcePool>
   <LayoutPreparationParams ...    B:AlternateRotation = "false"    ....    B:Rotate = "1" >
   ...
   </LayoutPreparationParams>
 </ResourcePool>
</JDF>
```

| JDF OF COMPANY C | | JOB ATTRIBUTE WITHIN DFE | |
|---|---|---|---|
| ATTRIBUTE NAME | VALUE | ITEM NAME | ITEM VALUE |
| Amount | 1~32767 | NO. OF COPIES | 1~32767 COPIES |
| Rotate | | ROTATION | |
| | Rotate0 | | 0° ROTATION |
| | Rotate90 | | 90° ROTATION |
| | Rotate180 | | 180° ROTATION |
| | Rotate270 | | 270° ROTATION |
| ... | ... | ... | ... |

FIG.7B

| JDF OF COMPANY A | | JOB ATTRIBUTE WITHIN DFE | |
|---|---|---|---|
| ATTRIBUTE NAME | VALUE | ITEM NAME | ITEM VALUE |
| A:Amount | 1~32767 | NO. OF COPIES | 1~32767 COPIES |
| A:Rotate | | ROTATION | |
| | 1 | | 0° ROTATION |
| | 2 | | 90° ROTATION |
| | 3 | | 180° ROTATION |
| | 4 | | 270° ROTATION |
| ... | ... | ... | ... |

| JDF OF COMPANY B | | JOB ATTRIBUTE WITHIN DFE | |
|---|---|---|---|
| ATTRIBUTE NAME | VALUE | ITEM NAME | ITEM VALUE |
| B:DeliveryAmount | 1~32767 | NO. OF COPIES | 1~32767 COPIES |
| B:AlternateRotation | true | ROTATION | |
| | false | | |
| B:Rotate | 1 | | 0° ROTATION |
| | 2 | | 90° ROTATION |
| | 3 | | 180° ROTATION |
| | 4 | | 270° ROTATION |
| | ⋮ | ⋮ | ⋮ |
| ⋮ | | | |

JOB ATTRIBUTE WITHIN DFE

| | ITEM | |
|---|---|---|
| JOB INFORMATION | NO. OF COPIES | |
| | ORIENTATION INFORMATION | |
| | PRINTING FACE INFORMATION | |
| | ROTATION | |
| | ENLARGE/REDUCE | |
| EDIT INFORMATION | IMAGE POSITION | OFFSET |
| | | POSITION ADJUSTMENT INFORMATION |
| | LAYOUT POSITION | CUSTOM IMPOSITION ARRANGEMENT |
| | | NO. OF PAGES |
| | | IMPOSITION INFORMATION |
| | | PAGE ORDER INFORMATION |
| | | CREEP POSITION ADJUSTMENT |
| | MARGIN INFORMATION | |
| | CROP MARK INFORMATION | CENTER CROP MARK INFORMATION |
| | | CORNER CROP MARK INFORMATION |
| FINISHING INFORMATION | COLLATE INFORMATION | |
| | STAPLE/BIND INFORMATION | |
| | PUNCH INFORMATION | |
| | FOLD INFORMATION | |
| | TRIM INFORMATION | |
| | OUTPUT TRAY INFORMATION | |
| | INPUT TRAY INFORMATION | |
| | COVER SHEET INFORMATION | |
| RIP CONTROL MODE (PAGE MODE OR SHEET MODE) | | |

FIG.10

RIP PARAMETER LIST DATA FORMAT

| ITEM | | |
|---|---|---|
| INPUT/OUTPUT DATA TYPE INFORMATION | | |
| INPUT/OUTPUT DATA READ/WRITE POSITION SPECIFICATION SCHEME INFORMATION | | |
| INPUT/OUTPUT DATA READ/WRITE POSITION INFORMATION | | |
| INPUT/OUTPUT DATA READ/WRITE EXECUTION MODE INFORMATION | | |
| UNIT INFORMATION (DIMENSION) | | |
| INPUT/OUTPUT DATA COMPRESSION SCHEME INFORMATION | | |
| RIP CONTROL MODE | | |
| INPUT/ OUTPUT IMAGE INFORMATION UNIT | INFORMATION RELATED TO OUTPUT IMAGE | IMAGE FORMAT TYPE |
| | | IMAGE FORMAT DIMENSION |
| | | IMAGE FORMAT RESOLUTION |
| | | IMAGE POSITION |
| | | COLOR SEPARATION INFORMATION |
| | | COLOR PLANE FIT POLICY INFORMATION |
| | | PLANE SHIFT INFORMATION |
| | | NO. OF IMAGE FORMAT COLOR BITS |
| | | IMAGE ORIENTATION INFORMATION |
| | | IMAGE FORMATION POSITION INFORMATION |
| | | IMAGE FORMATION SIZE INFORMATION |
| | | IMAGE FORMATION SCHEME INFORMATION |
| | | COLOR ICC INFORMATION |
| | | FONT SUBSTITUTION INFORMATION |
| | | IMAGE FORMATION BASE POINT INFORMATION |
| | | FLAT K BLACK INFORMATION |
| | | RENDERING INFORMATION |
| | INFORMATION RELATED TO INPUT IMAGE | IMAGE FORMAT TYPE |
| | | IMAGE FORMAT DIMENSION |
| | | IMAGE FORMAT RESOLUTION |
| | | IMAGE POSITION |
| | | INPUT DATA |
| | | PAGE RANGE INFORMATION |
| | | COLOR ICC INFORMATION |
| | INFORMATION RELATED TO IMAGE HANDLING | SCALING OFFSET INFORMATION |
| | | OBJECT AREA INFORMATION |
| | | HALFTONE INFORMATION |
| | | SCALING ALGORITHM INFORMATION |
| INFORMATION RELATED TO PDL | DATA AREA | |
| | SIZE INFORMATION | |
| | DATA ARRANGEMENT SCHEME | |

| ITEM | | VALUE WITHIN JDF | CONVERTED DFE JOB ATTRIBUTE VALUE | EVALUATION VALUE | |
|---|---|---|---|---|---|
| JOB INFOR-MATION | NO. OF COPIES | 0~32768 | 0~32768 | 0 | |
| | | 32769~ | 32768 | -5 | |
| EDIT INFOR-MATION | ORIENTATION INFORMATION | Portrait | Portrait | 0 | |
| | | Landscape | Landscape | | |
| | | ORIENTATION TYPE 1 | Portrait | -1 | |
| | | ORIENTATION TYPE 2 | Landscape | | |
| | | ORIENTATION TYPE 3 | Portrait | -5 | |
| | PRINTING FACE INFORMATION | FRONT FACE | FRONT FACE | 0 | |
| | | BACK FACE | BACK FACE | | |
| | | DOUBLE FACE | DOUBLE FACE | | |
| | | FRONT FACE SINGLE SIDE | FRONT FACE | -1 | |
| | | BACK FACE SINGLE SIDE | BACK FACE | | |
| | | PRINTING FACE TYPE 1 | FRONT FACE | | |
| | | PRINTING FACE TYPE 2 | BACK FACE | | |
| | | PRINTING FACE TYPE 3 | DOUBLE FACE | | |
| | | PRINTING FACE TYPE 4 | FRONT FACE | -5 | |
| | ROTATION | 0° | 0° | 0 | |
| | | 90° | 90° | | |
| | | 180° | 180° | | |
| | | 270° | 270° | | |
| | | 355° < x ≦ 5° | 0° | -1 | |
| | | 85° < x ≦ 95° | 90° | | |
| | | 175° < x ≦ 185° | 180° | | |
| | | 265° < x ≦ 275° | 270° | | |
| | | 5° < x ≦ 45° | 0° | -5 | |
| | | 45° < x ≦ 85° | 90° | | |
| | | 95° < x ≦ 135° | 90° | | |
| | | 135° < x ≦ 175° | 180° | | |
| | | 185° < x ≦ 225° | 180° | | |
| | | 225° < x ≦ 265° | 270° | | |
| | | 275° < x ≦ 315° | 270° | | |
| | | 315° < x ≦ 355° | 0° | | |
| | ENLARGE/ REDUCE | ClipToMaxPage | ClipToMaxPage | 0 | |
| | | FitToPage | FitToPage | | |
| | | ReduceToFit | ReduceToFit | | |
| | | ENLARGE/REDUCE TYPE 1 | ClipToMaxPage | -1 | |
| | | ENLARGE/REDUCE TYPE 2 | FitToPage | | |
| | | ENLARGE/REDUCE TYPE 3 | ReduceToFit | | |
| | | ENLARGE/REDUCE TYPE 4 | ClipToMaxPage | -5 | |
| | | ENLARGE/REDUCE TYPE 5 | ClipToMaxPage | | |
| | IMAGE POSI-TION | OFFSET | 0<= x <= Xa | 0<= x <= Xa | 0 | *1 |
| | | Xa < x <= Xb | Xa | -2 | *2 |
| | | Xb < x | Xa | -5 | *3 |
| | | 0<= y <= Ya | 0<= y <= Ya | 0 | *4 |
| | | Ya < y <= Yb | Ya | -2 | *5 |
| | | Yb < y | Ya | -5 | *6 |
| | | POSI-TION ADJUST-MENT INFOR-MATION | CENTER | CENTER | 0 | |
| | | | UPPER RIGHT | UPPER RIGHT | | |
| | | | LOWER LEFT | LOWER LEFT | | |
| | | | POSITION ADJUSTMENT TYPE 1 | CENTER | -1 | |
| | | | POSITION ADJUSTMENT TYPE 2 | UPPER RIGHT | | |
| | | | POSITION ADJUSTMENT TYPE 3 | LOWER LEFT | | |
| | | | POSITION ADJUSTMENT TYPE 4 | CENTER | -5 | |
| | | | POSITION ADJUSTMENT TYPE 5 | CENTER | | |

*1: HERE, x IS AN ARBITRARY VALUE OF THE OFFSET IN THE X DIRECTION.
*2: Xa IS A SPECIFIED VALUE DENOTING THE UPPER LIMIT OF THE SUPPORT RANGE.
*3: Xb IS A SPECIFIED VALUE DENOTING THE UPPER LIMIT OF ROUNDING.
*4: HERE, y IS AN ARBITRARY VALUE OF THE OFFSET IN THE Y DIRECTION.
*5: Ya IS A SPECIFIED VALUE DENOTING THE UPPER LIMIT OF THE SUPPORT RANGE.
*6: Yb IS A SPECIFIED VALUE DENOTING THE UPPER LIMIT OF ROUNDING.

FIG.11

| EDIT INFOR-MATION | LAYOUT INFOR-MATION | CUSTOM IMPO-SITION ARRANGE-MENT | m X n up PROVIDED THAT 1<= m <= 4 AND 1<= n <= 4 | m X n up PROVIDED THAT 1<= m <= 4 AND 1<= n <= 4 | 0 | |
|---|---|---|---|---|---|---|
| | | | m X n up PROVIDED THAT 4 < m AND 4 < n | m X n up PROVIDED THAT 1<= m <= 4 AND 1<= n <= 4 | -5 | |
| | | NO. OF PAGES | NO.-OF-PAGES TYPE 1 | NO.-OF-PAGES TYPE 1 | 0 | |
| | | | NO.-OF-PAGES TYPE 2 | NO.-OF-PAGES TYPE 2 | | |
| | | | NO.-OF-PAGES TYPE 3 | NO.-OF-PAGES TYPE 3 | | |
| | | | NO.-OF-PAGES TYPE 4 | NO.-OF-PAGES TYPE 4 | | |
| | | | NO.-OF-PAGES TYPE 5 | NO.-OF-PAGES TYPE 5 | | |
| | | | NO.-OF-PAGES TYPE 6 | NO.-OF-PAGES TYPE 6 | | |
| | | | NO.-OF-PAGES TYPE 7 | NO.-OF-PAGES TYPE 1 | -5 | |
| | | | NO.-OF-PAGES TYPE 8 | NO.-OF-PAGES TYPE 2 | | |
| | | | NO.-OF-PAGES TYPE 9 | NO.-OF-PAGES TYPE 3 | | |
| | | IMPOSI-TION INFOR-MATION | Normal | Normal | 0 | |
| | | | Booklet | Booklet | | |
| | | | Magazine | Magazine | | |
| | | | THE OTHER VALUE | EITHER OF NORMAL, BOOKLET, AND MAGAZINE | -5 | |
| | | PAGE ORDER INFOR-MATION | PAGE ORDER TYPE 1 | PAGE ORDER TYPE 1 | 0 | |
| | | | PAGE ORDER TYPE 2 | PAGE ORDER TYPE 2 | | |
| | | | PAGE ORDER TYPE 3 | PAGE ORDER TYPE 3 | | |
| | | | PAGE ORDER TYPE 4 | PAGE ORDER TYPE 4 | | |
| | | | PAGE ORDER TYPE 5 | PAGE ORDER TYPE 5 | | |
| | | | PAGE ORDER TYPE 6 | PAGE ORDER TYPE 6 | | |
| | | | PAGE ORDER TYPE 7 | PAGE ORDER TYPE 7 | | |
| | | | PAGE ORDER TYPE 8 | PAGE ORDER TYPE 8 | | |
| | | | PAGE ORDER TYPE 9 | PAGE ORDER TYPE 1 | -5 | |
| | | | PAGE ORDER TYPE 10 | PAGE ORDER TYPE 2 | | |
| | | | PAGE ORDER TYPE 11 | PAGE ORDER TYPE 3 | | |
| | | CREEP POSI-TION ADJUST-MENT | 0<= x <= CXa | 0<= x <= CXa | 0 | *1 |
| | | | CXa < x <= CXb | CXa | -2 | *2 |
| | | | CXb < x | CXa | -5 | *3 |
| | | | 0<= y <= CYa | 0<= y <= CYa | 0 | *4 |
| | | | CYa < y <= CYb | CYa | -2 | *5 |
| | | | CYb < y | CYa | -5 | *6 |
| | MARGIN INFORMATION | | 0<= x <= Ma | 0<= x <= Ma | 0 | *7 |
| | | | Ma < x <= Mb | Ma | -2 | *8 |
| | | | Mb < x | Ma | -5 | *9 |
| | CROP MARK INFOR-MATION | CENTER CROP MARK INFOR-MATION | NONE | NONE | 0 | |
| | | | FRONT FACE | FRONT FACE | | |
| | | | BACK FACE | BACK FACE | | |
| | | | DOUBLE FACE | DOUBLE FACE | | |
| | | | MARK TYPE 1 | NONE | -1 | |
| | | | MARK TYPE 2 | FRONT FACE | | |
| | | | MARK TYPE 3 | BACK FACE | | |
| | | | MARK TYPE 4 | NONE | -5 | |
| | | | MARK TYPE 5 | NONE | | |
| | | CORNER CROP MARK INFOR-MATION | NONE | NONE | 0 | |
| | | | FRONT FACE | FRONT FACE | | |
| | | | BACK FACE | BACK FACE | | |
| | | | DOUBLE FACE | DOUBLE FACE | | |
| | | | MARK TYPE A | NONE | -1 | |
| | | | MARK TYPE B | FRONT FACE | | |
| | | | MARK TYPE C | BACK FACE | | |
| | | | MARK TYPE D | NONE | -5 | |
| | | | MARK TYPE E | NONE | | |

*1: HERE, x IS AN ARBITRARY VALUE OF THE CREEP POSITION IN THE X DIRECTION.
*2: CYa IS A SPECIFIED VALUE DENOTING THE UPPER LIMIT OF THE SUPPORT RANGE.
*3: CYb IS A SPECIFIED VALUE DENOTING THE UPPER LIMIT OF ROUNDING.
*4: HERE, y IS AN ARBITRARY VALUE OF THE CREEP POSITION IN THE Y DIRECTION.
*5: CYa IS A SPECIFIED VALUE DENOTING THE UPPER LIMIT OF THE SUPPORT RANGE.
*6: CYb IS A SPECIFIED VALUE DENOTING THE UPPER LIMIT OF ROUNDING.
*7: HERE, x IS AN ARBITRARY VALUE OF THE MARGIN.
*8: Ma IS A SPECIFIED VALUE DENOTING THE UPPER LIMIT OF THE SUPPORT RANGE.
*9: Mb IS A SPECIFIED VALUE DENOTING THE UPPER LIMIT OF ROUNDING.

| FINISH-ING INFOR-MATION | COLLATE INFOR-MATION | None | None | 0 |
|---|---|---|---|---|
| | | Sheet | Sheet | |
| | | SheetSetAndJob | SheetSetAndJob | |
| | | COLLATE TYPE 1 | None | -2 |
| | | COLLATE TYPE 2 | Sheet | |
| | | COLLATE TYPE 3 | SheetSetAndJob | |
| | | COLLATE TYPE 4 | None | -5 |
| | | COLLATE TYPE 5 | None | |
| | STAPLE /BIND INFOR-MATION | NONE | NONE | 0 |
| | | Side | Side | |
| | | Corner | Corner | |
| | | Saddle | Saddle | |
| | | BIND TYPE 1 | NONE | -1 |
| | | BIND TYPE 2 | Side | |
| | | BIND TYPE 3 | Corner | |
| | | BIND TYPE 4 | Saddle | |
| | | BIND TYPE 5 | NONE | -5 |
| | | BIND TYPE 6 | NONE | |
| | PUNCH INFOR-MATION | NONE | NONE | 0 |
| | | TWO-HOLE | TWO-HOLE | |
| | | FOUR-HOLE | FOUR-HOLE | |
| | | MULTI-HOLE | MULTI-HOLE | |
| | | PUNCH TYPE 1 | NONE | -1 |
| | | PUNCH TYPE 2 | TWO-HOLE | |
| | | PUNCH TYPE 3 | FOUR-HOLE | |
| | | PUNCH TYPE 4 | MULTI-HOLE | |
| | | PUNCH TYPE 5 | NONE | -5 |
| | | PUNCH TYPE 6 | NONE | |
| | FOLD INFOR-MATION | NONE | NONE | 0 |
| | | Z-fold | Z-fold | |
| | | Half-fold | Half-fold | |
| | | Letter-fold in | Letter-fold in | |
| | | Letter-fold out | Letter-fold out | |
| | | FOLD TYPE 1 | NONE | -1 |
| | | FOLD TYPE 2 | Z-fold | |
| | | FOLD TYPE 3 | Half-fold | |
| | | FOLD TYPE 4 | Letter-fold in | |
| | | FOLD TYPE 5 | Letter-fold out | |
| | | FOLD TYPE 6 | NONE | -5 |
| | | FOLD TYPE 7 | NONE | |
| | TRIM INFOR-MATION | NONE | NONE | 0 |
| | | Top edge | Top edge | |
| | | Fore edge | Fore edge | |
| | | Bottom edge | Bottom edge | |
| | | TRIM TYPE 1 | NONE | -1 |
| | | TRIM TYPE 2 | Top edge | |
| | | TRIM TYPE 3 | Fore edge | |
| | | TRIM TYPE 4 | Bottom edge | |
| | | TRIM TYPE 5 | NONE | -5 |
| | | TRIM TYPE 6 | NONE | |

FIG.14

| FINISHING INFORMATION | | | | |
|---|---|---|---|---|
| | OUTPUT TRAY INFORMATION | OutputTray0 | OutputTray0 | 0 |
| | | OutputTray1 | OutputTray1 | -1 |
| | | .. | .. | |
| | | OutputTray5 | OutputTray5 | |
| | | OUTPUT TRAY TYPE 1 | OutputTray0 | |
| | | OUTPUT TRAY TYPE 2 | OutputTray1 | |
| | | .. | .. | |
| | | OUTPUT TRAY TYPE 6 | OutputTray5 | |
| | | OUTPUT TRAY TYPE 7 | OutputTray0 | |
| | | OUTPUT TRAY TYPE 8 | OutputTray0 | |
| | INPUT TRAY INFORMATION | InputTray0 | InputTray0 | 0 |
| | | InputTray1 | InputTray1 | -1 |
| | | .. | .. | |
| | | InputTray5 | InputTray5 | |
| | | INPUT TRAY TYPE 1 | InputTray0 | |
| | | INPUT TRAY TYPE 2 | InputTray1 | |
| | | .. | .. | |
| | | INPUT TRAY TYPE 6 | InputTray5 | |
| | | INPUT TRAY TYPE 7 | InputTray0 | |
| | | INPUT TRAY TYPE 8 | InputTray0 | |
| | COVER SHEET INFORMATION | NONE | NONE | 0 |
| | | FRONT COVER | FRONT COVER | -1 |
| | | BACK COVER | BACK COVER | |
| | | FRONT AND BACK COVER | FRONT AND BACK COVER | |
| | | COVER SHEET TYPE 1 | NONE | -5 |
| | | COVER SHEET TYPE 2 | FRONT COVER | |
| | | COVER SHEET TYPE 3 | BACK COVER | |
| | | COVER SHEET TYPE 4 | FRONT AND BACK COVER | |
| | | COVER SHEET TYPE 5 | NONE | |
| | | COVER SHEET TYPE 6 | NONE | |

FIG.15

| ITEM | | | | VALUE WITHIN JDF | CONVERTED DFE JOB ATTRIBUTE VALUE |
|---|---|---|---|---|---|
| JOB INFORMATION | NO. OF COPIES | | | 1 | 1 |
| EDIT INFORMATION | ORIENTATION INFORMATION | | | Portrait | Portrait |
| | PRINTING FACE INFORMATION | | | FRONT FACE SINGLE SIDE | FRONT FACE |
| | ROTATION | | | 0° | 0° |
| | ENLARGE/REDUCE | | | FitToPage | FitToPage |
| | IMAGE POSITION | OFFSET | | x PROVIDED THAT 0<= x <= Xa | x |
| | | | | y PROVIDED THAT 0<= y <= Ya | y |
| | | POSITION ADJUSTMENT INFORMATION | | CENTER | CENTER |
| | LAYOUT INFORMATION | CUSTOM IMPOSITION ARRANGEMENT | | 1 X 1 up | 1 X 1 up |
| | | NO. OF PAGES | | NO.-OF-PAGES TYPE 1 | NO.-OF-PAGES TYPE 1 |
| | | IMPOSITION INFORMATION | | Normal | Normal |
| | | PAGE ORDER INFORMATION | | PAGE ORDER TYPE 1 | PAGE ORDER TYPE 1 |
| | | CREEP POSITION ADJUSTMENT | | x PROVIDED THAT 0<= x <= CXa | x |
| | | | | y PROVIDED THAT CYa < y <= CYb | CYa |
| | MARGIN INFORMATION | | | x PROVIDED THAT 0<= x <= Ma | x |
| | CROP MARK INFORMATION | CENTER CROP MARK INFORMATION | | NONE | NONE |
| | | CORNER CROP MARK INFORMATION | | NONE | NONE |
| FINISHING INFORMATION | COLLATE INFORMATION | | | None | None |
| | STAPLE/BIND INFORMATION | | | NONE | NONE |
| | PUNCH INFORMATION | | | NONE | NONE |
| | FOLD INFORMATION | | | NONE | NONE |
| | TRIM INFORMATION | | | NONE | NONE |
| | OUTPUT TRAY INFORMATION | | | OutputTray1 | OutputTray1 |
| | INPUT TRAY INFORMATION | | | InputTray0 | InputTray0 |
| | COVER SHEET INFORMATION | | | NONE | NONE |

FIG.16

| ITEM | | | | VALUE WITHIN JDF | CONVERTED DFE JOB ATTRIBUTE VALUE | EVALUATION VALUE |
|---|---|---|---|---|---|---|
| JOB INFORMATION | NO. OF COPIES | | | 1 | 1 | 0 |
| EDIT INFORMATION | ORIENTATION INFORMATION | | | Portrait | Portrait | 0 |
| | PRINTING FACE INFORMATION | | | FRONT FACE SINGLE SIDE | FRONT FACE | -1 |
| | ROTATION | | | 0° | 0° | 0 |
| | ENLARGE/REDUCE | | | FitToPage | FitToPage | 0 |
| | IMAGE POSITION | OFFSET | | x PROVIDED THAT 0<= x <= Xa | x | 0 |
| | | | | y PROVIDED THAT 0<= y <= Ya | y | 0 |
| | | POSITION ADJUSTMENT INFORMATION | | CENTER | CENTER | 0 |
| | LAYOUT INFORMATION | CUSTOM IMPOSITION ARRANGEMENT | | 1 X 1 up | 1 X 1 up | 0 |
| | | NO. OF PAGES | | NO.-OF-PAGES TYPE 1 | NO.-OF-PAGES TYPE 1 | 0 |
| | | IMPOSITION INFORMATION | | Normal | Normal | 0 |
| | | PAGE ORDER INFORMATION | | PAGE ORDER TYPE 1 | PAGE ORDER TYPE 1 | 0 |
| | | CREEP POSITION ADJUSTMENT | | x PROVIDED THAT 0<= x <= CXa | x | 0 |
| | | | | y PROVIDED THAT CYa < y <= CYb | CYa | -2 |
| | MARGIN INFORMATION | | | x PROVIDED THAT 0<= x <= Ma | x | 0 |
| | CROP MARK INFORMATION | CENTER CROP MARK INFORMATION | | NONE | NONE | 0 |
| | | CORNER CROP MARK INFORMATION | | NONE | NONE | 0 |
| FINISHING INFORMATION | COLLATE INFORMATION | | | None | None | 0 |
| | STAPLE/BIND INFORMATION | | | NONE | NONE | 0 |
| | PUNCH INFORMATION | | | NONE | NONE | 0 |
| | FOLD INFORMATION | | | NONE | NONE | 0 |
| | TRIM INFORMATION | | | NONE | NONE | 0 |
| | OUTPUT TRAY INFORMATION | | | OutputTray1 | OutputTray1 | 0 |
| | INPUT TRAY INFORMATION | | | InputTray0 | InputTray0 | 0 |
| | COVER SHEET INFORMATION | | | NONE | NONE | 0 |
| | | | | | TOTAL | -3 |

JOB STOP DISPLAY

FIG.21A

PRE-AND POST-CONVERSION INFORMATION

| ITEM | | VALUE WITHIN JDF | CONVERTED DFE JOB ATTRIBUTE VALUE |
|---|---|---|---|
| FINISHING INFORMATION | COLLATE INFORMATION | None | None |
| | STAPLE/BIND INFORMATION | NONE | NONE |
| | PUNCH INFORMATION | BIND TYPE 1 | NONE |
| | FOLD INFORMATION | FOLD TYPE 1 | NONE |
| | TRIM INFORMATION | TRIM TYPE 5 | NONE |
| | OUTPUT TRAY INFORMATION | OutputTray1 | OutputTray1 |
| | INPUT TRAY INFORMATION | InputTray0 | InputTray0 |
| | COVER SHEET INFORMATION | NONE | NONE |

FIG.21B

| PRINTER FEATURE INFORMATION | |
|---|---|
| COLLATE FUNCTION | AVAILABLE |
| STAPLE/BIND FUNCTION | AVAILABLE |
| PUNCH FUNCTION | AVAILABLE |
| FOLD FUNCTION | AVAILABLE |
| TRIM FUNCTION | NONE |
| OUTPUT TRAY | AVAILABLE |
| INPUT TRAY | AVAILABLE |
| COVER SHEET | AVAILABLE |

FIG.21C

| ITEM | | VALUE WITHIN JDF | CONVERTED DFE JOB ATTRIBUTE VALUE | EVALUATION VALUE (NOT TAKING FEATURES INTO ACCOUNT) | EVALUATION VALUE (TAKING FEATURES INTO ACCOUNT) |
|---|---|---|---|---|---|
| FINISHING INFORMATION | COLLATE INFORMATION | None | None | 0 | 0 |
| | STAPLE/BIND INFORMATION | NONE | NONE | 0 | 0 |
| | PUNCH INFORMATION | BIND TYPE 1 | NONE | -1 | -1 |
| | FOLD INFORMATION | FOLD TYPE 1 | NONE | -1 | -1 |
| | TRIM INFORMATION | TRIM TYPE 5 | NONE | -5 | 0 |
| | OUTPUT TRAY INFORMATION | OutputTray1 | OutputTray1 | 0 | 0 |
| | INPUT TRAY INFORMATION | InputTray0 | InputTray0 | 0 | 0 |
| | COVER SHEET INFORMATION | NONE | NONE | 0 | 0 |

INFORMATION PROCESSING APPARATUS, METHOD, AND PROGRAM CREATING RENDERING DATA USING A SETTING INFORMATION SET CONVERTED ACCORDING TO A SELECTED SCHEME

CROSS-REFERENCE TO RELATED APPLICATIONS

The present application claims priority to and incorporates by reference the entire contents of Japanese Patent Application No. 2014-020232 filed in Japan on Feb. 5, 2014 and Japanese Patent Application No. 2015-018135 filed in Japan on Feb. 2, 2015.

TECHNICAL FIELD

The present invention relates to information processing apparatuses which create rendering data from a print job.

BACKGROUND ART

So-called production printing is known, wherein a large volume of documents for business use is printed and bound. (See Patent Document 1, for example). Patent Document 1 discloses a printing system which makes it possible to notify a user of whether post-processing is available by taking into account the whole printing system.

In the production printing, a printing process is often handled as a workflow. Opening of such a printing workflow is being promoted. The opening makes it possible for software (a below-described workflow application) and printing equipment units of the respective companies to describe the setting of a print job in a main printing process, etc., in common description schemes. A standard format called a JDF (Job Definition Format) is known as a format which describes the whole printing workflow processes.

The printing workflow processes include various processes such as creation of a document and content, specification of a printing method, printing, post-processing, etc. While these respective processes are carried out by various workflow applications and printing equipment units, the JDF makes it possible to perform collaboration among the printing equipment units, printing process management, etc., regardless of the differences among manufacturers of the workflow applications and the printing equipment units.

PATENT DOCUMENT

Patent Document 1: JP2012-238188A

However, the JDF may be extended by the respective workflow applications and printing equipment units, in which case, the JDF created by the workflow application of the respective company may include a description unique to the workflow application. In this case, it is known that a situation may arise in which the workflow application and printing equipment unit in a lower-level process cannot analyze the JDF to process the analyzed JDF.

Thus, the workflow application and printing equipment unit in the lower-level process analyzes the JDF to determine a manufacturer of the workflow application which created the JDF. The manufacturer of the workflow application which created the JDF may be determined for the workflow application and the printing equipment unit in the lower-level process to take into account a format of the JDF of the respective manufacturers even when the JDF is extended to convert setting information to one which may be handled by itself.

However, when the JDF is created by an unknown workflow application, it may not be possible for the workflow application and the printing equipment unit in the lower-level process to determine the manufacturer of the workflow application which created the JDF. In this case, there is a problem that the workflow application and the printing equipment unit in the lower-level process cannot render the print job.

On the other hand, even when the manufacturer of the workflow application which created the JDF cannot be determined, it may often be possible to perform printing. Moreover, a user may wish to cause printing to be performed even when there is some difference between the quality of the printing performed and the finished quality intended. However, there is a problem that converting the JDF to the setting information on the assumption of an arbitrary manufacturer may lead to an increased difference between the quality of the printing performed and the finished quality intended by the user.

Moreover, the manufacturer of the workflow application which created the JDF may be erroneously determined; even in such a case, it is preferable to perform printing with the finished quality intended by the user as much as possible.

DISCLOSURE OF THE INVENTION

In light of the problems described above, an object of the present invention is to provide an information processing apparatus which can convert a print job to appropriate printing results.

According to an embodiment of the present invention, an information processing apparatus which creates rendering data using a print job including print data and a setting information set is provided, including a conversion unit which converts the setting information set to an apparatus setting information set by multiple schemes, the apparatus setting information set to be handled by the information processing apparatus; an evaluation value determination unit which determines an evaluation value of the apparatus setting information set for the respective schemes based on results of comparing the setting information set and the apparatus setting information set; and a rendering data creation unit which creates rendering data using the printing data and the apparatus setting information set converted by the scheme with the evaluation value higher than the other evaluation values.

The embodiments of the present invention make it possible to provide an information processing apparatus which can convert a print job to appropriate printing results.

BRIEF DESCRIPTION OF THE DRAWINGS

Other objects, features, and advantages of the present invention will become more apparent from the following detailed descriptions when read in conjunction with the accompanying drawings, in which:

FIGS. 6A-6C are exemplary diagrams for explaining a part of descriptions of a JDF;

FIGS. 7A-7C are diagrams illustrating an example of a conversion table;

FIG. 9 is a diagram illustrating one example of "job attribute within DFE";

FIG. 10 is a diagram illustrating one example of "RIP Parameter List";

FIG. 11 is a diagram illustrating one example of a conversion evaluation value calculation table;

FIG. 12 is a diagram illustrating one example of the conversion evaluation value calculation table;

FIG. 13 is a diagram illustrating one example of the conversion evaluation value calculation table;

FIG. 14 is a diagram illustrating one example of the conversion evaluation value calculation table;

FIG. 15 is a diagram illustrating the correspondence between "value within JDF" and "converted DFE job attribute value" for each item of "job attribute within DFE" for a certain JDF;

FIG. 16 is a diagram illustrating one example of evaluation values provided to the "value within JDF" and "converted DFE job attribute value" in FIG. 15;

FIGS. 21A-21C are exemplary diagrams for explaining calculations of the evaluation values that take into account printer features.

BEST MODE FOR CARRYING OUT THE INVENTION

Below, embodiments of the present invention are described with reference to the drawings.

(Schematic Operation of Printing System According to the Present Embodiment)

Figure 1:
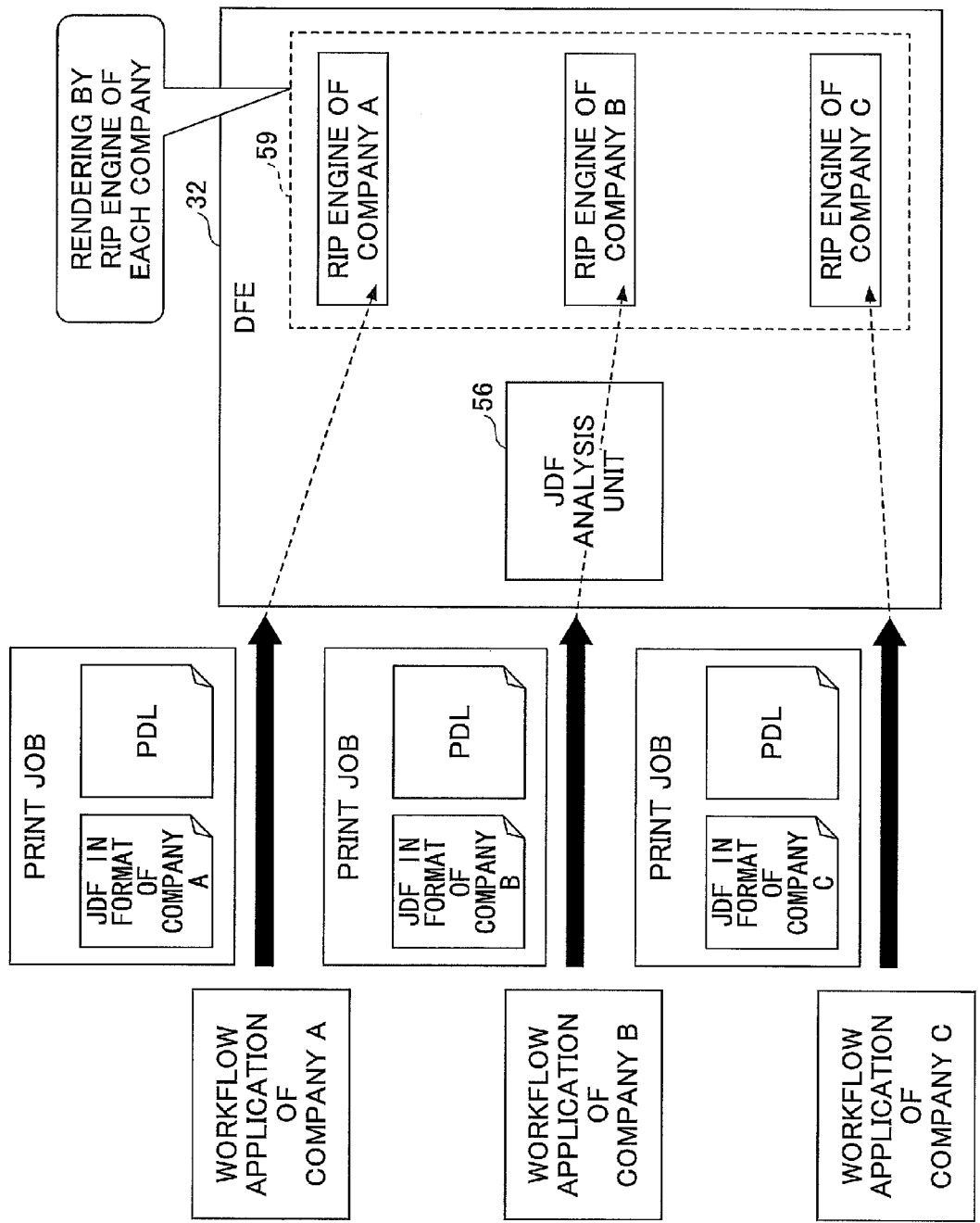
FIG. 1 is an exemplary drawing for explaining an operation when a print job created by a known workflow application is input.
Figure 2:
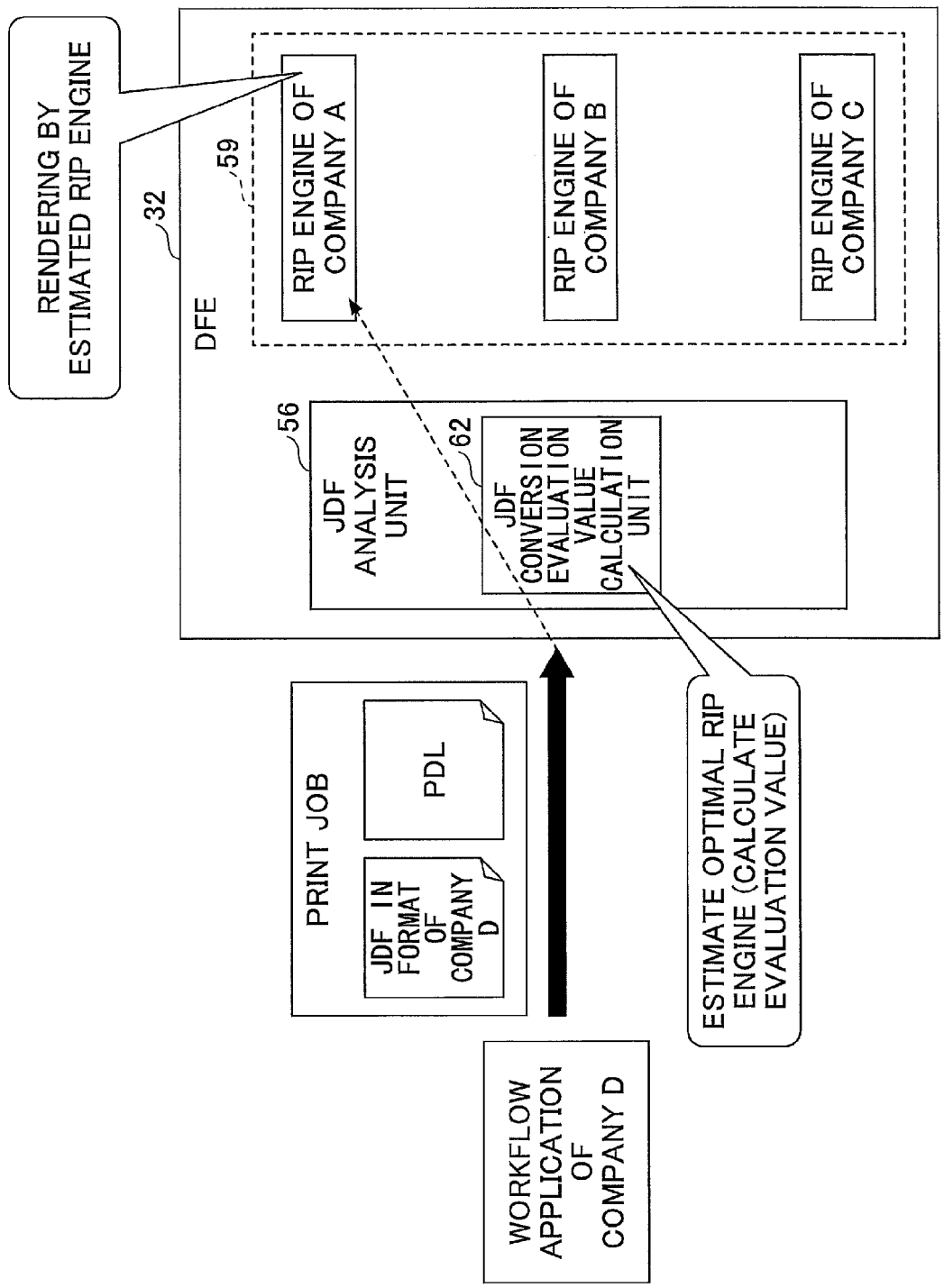
FIG. 2 is an exemplary drawing for describing an estimation of an RIP engine by a printing system according to the present embodiment.

First, a schematic operation of a printing system according to the present embodiment is explained using FIGS. 1 and 2. FIG. 1 is an exemplary drawing for explaining an operation when a print job (a JDF and a PDL) created by a known workflow application is input. As an RIP engine 59, a DFE (Digital front-end processor) 32 includes an RIP engine for Company A: an RIP engine for Company B; and an RIP engine for Company C.

The respective RIP engines are suitable for rendering a print job created for that RIP engine. Thus, a print job created by a workflow application of Company A is expected to be rendered by the RIP engine of Company A; a print job created by a workflow application of Company B is expected to be rendered by the RIP engine of Company B; and a print job created by a workflow application of Company C is expected to be rendered by the RIP engine of Company C. The workflow application and the RIP engine of Company XX includes not only those actually created by Company XX, but also those created "for Company XX".

Even when the JDF is being extended, the DFE 32 may determine which RIP engine the print job created by the workflow application of Company A, B, or C is expected to be rendered by to convert it to "job attribute within DFE" that is optimal for the RIP engine. The "job attribute within DFE" is the JDF converted into a format which may be handled by the DFE 32. In this way, the "job attribute within DFE" may be created for each RIP engine to print with the finished quality intended by a user even when the print job is created by the workflow application of the respective Companies.

However, if a print job created by an unknown workflow application is input, the DFE 32 may not render it with the finished quality intended by the user. Thus, the printing system according to the present embodiment estimates the most appropriate RIP engine to render a print job when an RIP engine corresponding to a workflow application which created a print job is not included therein.

FIG. 2 is an exemplary drawing for describing an estimation of an RIP engine by the printing system according to the present embodiment. A print job created by a workflow application of Company D is input into the DFE 32. When it cannot be determined as to which workflow application the print job was created by, a JDF analysis unit 56 creates "job attribute within DFE" for all of the RIP engines.

Then, a JDF conversion evaluation value calculation unit 62 calculates an evaluation value from results of converting from a JDF to the "job attribute within DFE" and estimates an RIP engine most appropriate for rendering the print job.

Thus, the DFE 32 may select an RIP engine which creates raster data with the quality which are closest to the finished quality intended by the user.

EXAMPLE 1

Exemplary configuration

Figure 3:
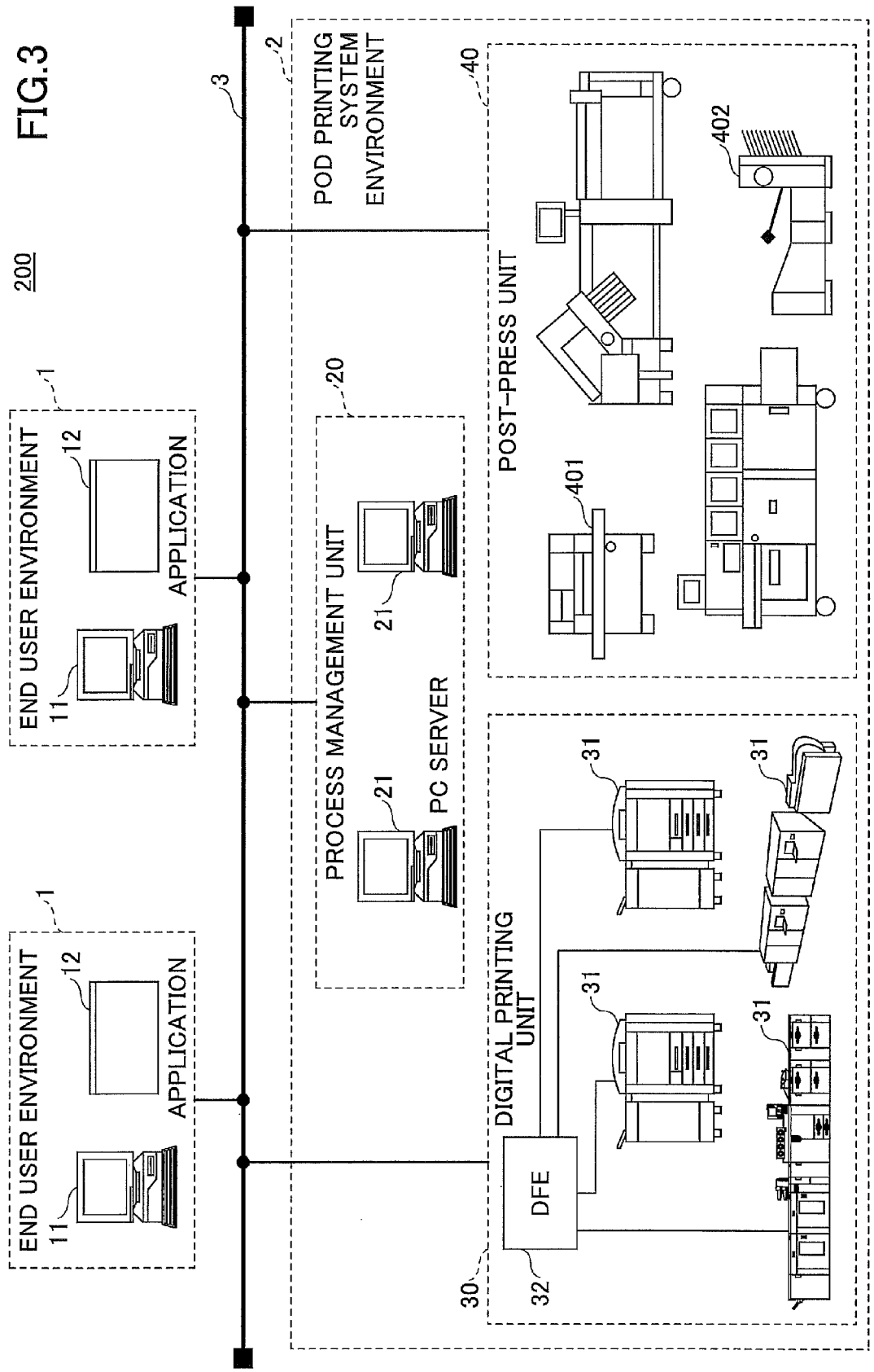
FIG. 3 is an exemplary overall configuration diagram of the printing system.

FIG. 3 illustrates one exemplary overall configuration diagram of a printing system 200 according to the present example. The printing system 200 according to the present example includes at least one end user environment 1 and a POD (print on demand) printing system environment 2 that are connected via a network 3 such as a LAN, the Internet, etc.

The end user environment 1 is provided with a client PC 11. The client PC 11, which has installed thereon a workflow application (below called merely an application) 12 for a POD printing operation, may accept an operation of a user to create a print job.

The application 12 may execute an image edit function for adding a page number, a footer, a header, an intensive printing function (a Number Up layout function) for pasting multiple logical page images onto a sheet face. Moreover, the application 12 may specify instructions for stapling, instructions for punching or for print binding. These instructions and settings are described in the JDF. The JDF may be called a "job ticket" or a "work instruction", a "printing instruction", etc.

The POD printing system environment 2 includes a process management unit 20; a digital printing unit 30, and a post-press unit 40 that are connected via the network 3. The process management unit 20 instructs tasks for the respective processes of the digital printing unit 30 and the post-press unit 40 in the POD printing system environment 2 and integrally manages the workflow of the POD printing system environment 2.

The process management unit 20 receives the print job (the JDF and the PDL) from the end user environment 1 and saves the print job. The JDF is one example of the claimed setting information. The PDL (Page Description Language) is one example of the claimed printing data. The PDL is a language for instructing rendering of a page image (a rasterized image);

herein, it means data described in the PDL. The PDL includes PDF (Portable document file), PostScript, PCL, RPDL, etc.

Moreover, based on the print job from the end user environment 1, the process management unit 20 may also assemble tasks in the respective processes as a workflow, efficiently schedule tasks of the digital printing unit 30, the post-press unit 40, and the respective operators, and notify the operator as needed when an error occurs at the time of an error occurrence during automatic operations. Generally, the process management unit 20 is configured to include at least one PC server 21.

The process management unit 20 transmits the print job to the digital printing unit 30, causing it to carry out printing thereof. Moreover, printed matter is delivered to the post-press unit 40, which performs binding, etc., according to instructions from the process management unit 20. The print job may be transmitted to the post-press unit 40 directly from the digital printing unit 30.

The digital printing unit 30 is configured to include various printers (printer apparatuses such as a production printer, a high-speed color inkjet printer, a color/monochrome MFP, etc.) 31. The digital printing unit 30 is provided with the DFE 32. The DFE 32, which is also called a "printer control apparatus", controls printing by the printers 31. The DFE 32 may be separate from the printers 31 as shown, or, may be integral with the printer 31. Upon obtaining the print job from the process management unit 20, the DFE 32 generates raster data (as one example of the claimed rendering data) for the printer 31 to form an image by ink, or a toner image to transmit the formed results to the printer 31.

The digital printing unit 30 includes various printers 31. The digital printing unit 30 may include a printer 31 which is directly connected to a finisher (a post-processing apparatus) for performing post-processing such as paper folding, saddle stitch binding, case binding, punching, etc. on printed recording paper.

The post-press unit 40 is configured to include a post-processing device such as a paper folding machine, a saddle stitching binding machine, a case binding machine, a cutting machine, an enclosing machine, a gathering machine, etc. Moreover, the post-press unit 40 executes a finishing process such as paper folding, saddle stitch binding, case binding, cutting, enclosing, gathering, etc., on the printed matter output from the digital printing unit 30. The post-press unit 40 includes post-processing apparatuses for performing post-processing after digital printing, such as a stapler 401, a hole punching machine 402, etc.

The end user of the end user environment 1 uses the application 12 for POD printing operation from the client PC 11 to instruct image editing, assembling, text insertion, post-processing, etc. and transmits the print job to the process management unit 20 of the POD printing system environment 2.

The PC server 21 of the process management unit 20 instructs the digital printing unit 30 to perform printing and the post-press unit 40 to perform post-processing.

(Hardware Configuration)

According to the present example, a print job created by the end user environment 1 is received by the process management unit 20, which transmits the print job to the DFE 32. While functions of the DFE 32 according to the present example do not necessarily have to be performed by the DFE 32 as long as they are performed by an equipment unit on a network, it is described such that, in the present example, the DFE 32 is to include functions of calculating an evaluation value, rendering by the RIP engine, etc.

Figure 4:
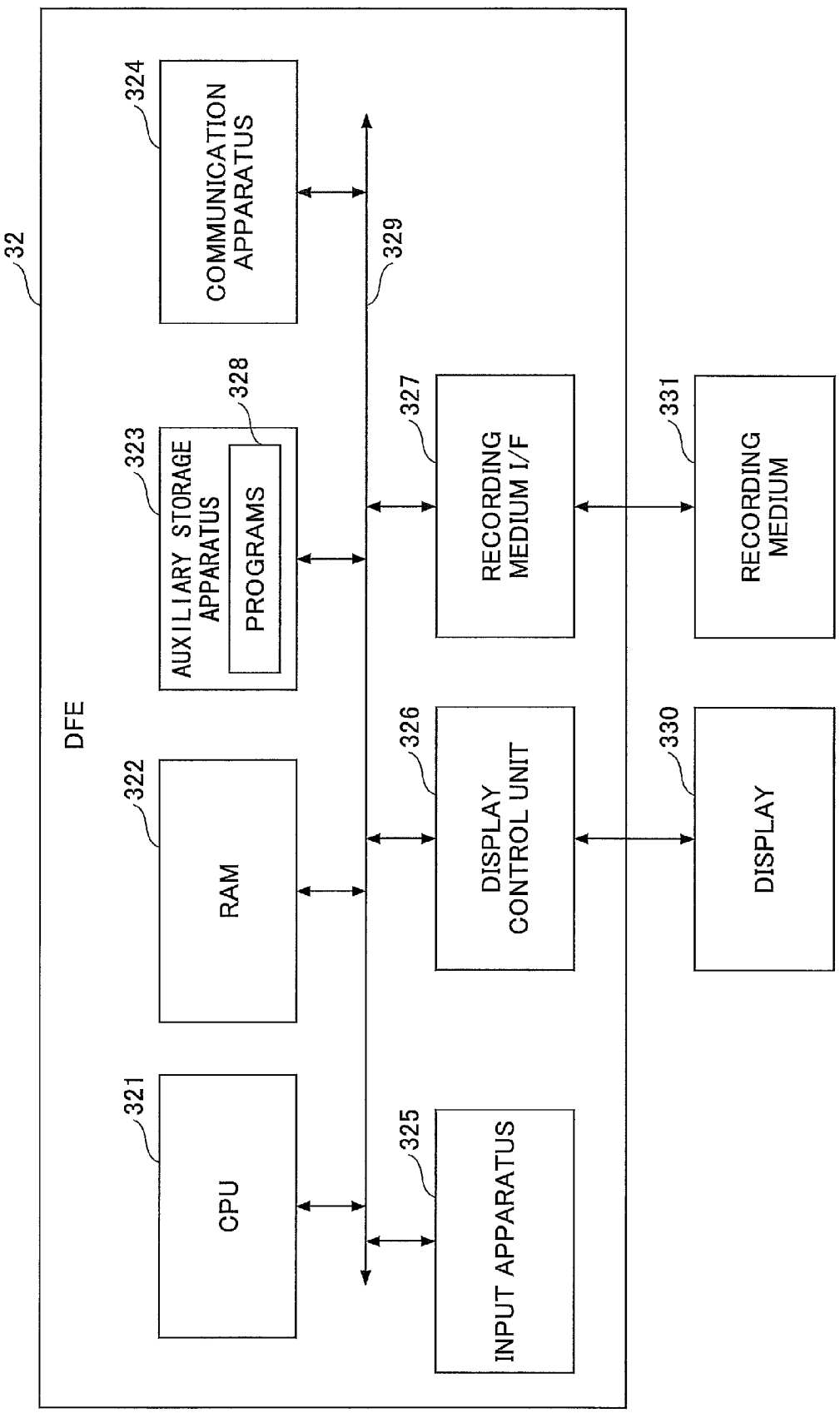
FIG. 4 is an exemplary hardware configuration diagram of a DFE.

FIG. 4 illustrates one example of a hardware configuration diagram of the DFE 32. The DFE 32 is realized by a hardware configuration as shown in FIG. 4, for example. In other words, the DFE 32 includes functions as an information processing apparatus (a computer). The DFE 32 includes a CPU 321, a RAM 322, an auxiliary storage apparatus 323, a communications apparatus 324, an input apparatus 325, a display control unit 326, and a recording medium I/F 327 that are mutually connected via a bus 329.

The CPU 321 executes programs with the RAM 322 as a work memory to control the whole DFE 32. The auxiliary storage apparatus 323 is a non-volatile memory such as a HDD (hard disk drive), an SSD (solid state drive), etc. The auxiliary storage apparatus 323 stores programs 328 which include a function for converting the print job.

The communications apparatus 324, which may be a modem, a LAN card, etc., connects to the network 3 to communicate with the end user environment 1, the process management unit 20, or the post-press unit 40. Moreover, it communicates with the printer 31. The input apparatus 325, which may be a keyboard, a mouse, etc., is an apparatus which accepts a user operation. The display control unit 326, which is connected to a display 330, displays a screen on the display 330 according to instructions from the CPU 321. The display 330 may be a touch panel.

The recording medium I/F 327, which can attach thereto and detach therefrom a portable recording medium, writes data onto a recording medium 331 and reads data from the recording medium 331 in accordance with instructions from the CPU 321. For the recording medium 331, various types of media may be used, such as, for example, a CD-ROM, an optical disk, a USB memory, an SD card (registered trademark), etc., a medium for optical, electrical, or magnetic recording, a semiconductor memory which electrically records information, such as a flash memory, etc.

The programs 328 may be delivered in a form stored in the recording medium 331, or delivered by downloading via the network 3 from a server for program distribution.

Moreover, a hardware configuration chart of the client PC 11 of the end user environment 1 and the PC server 21 of the process management unit 20 may be realized in the same configuration as in FIG. 4.

(DFE Functions)

Figure 5:
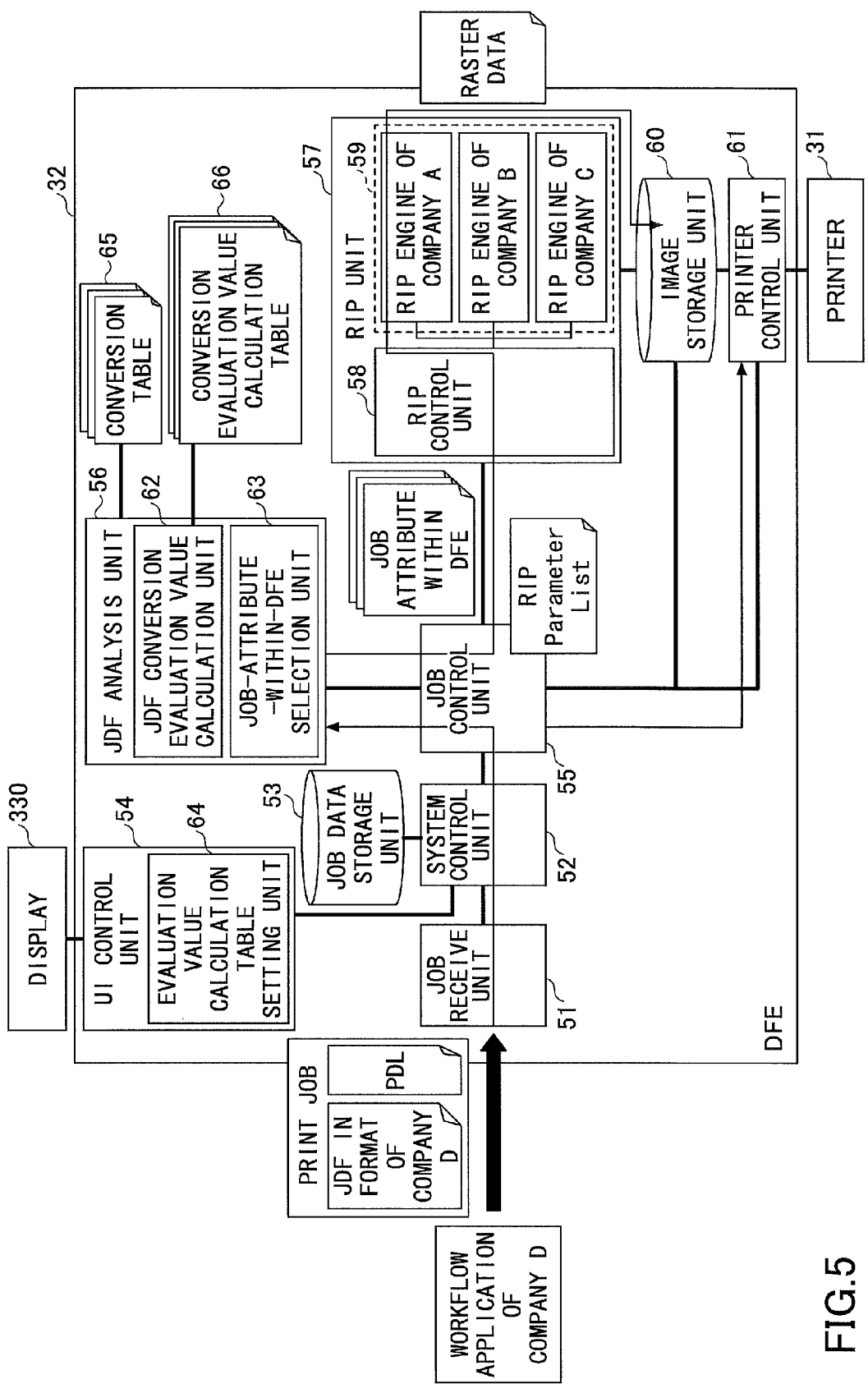
FIG. 5 is an exemplary functional block diagram of the DFE.

FIG. 5 is an exemplary functional block diagram of the DFE. The DFE 32 performs job control, RIP (Raster Image Processor) control, and printer control in the printing workflow. In this way, the DFE 32 operates as a server which provides major printing functions to the end user environment 1 and the process management unit 20. The job control means controlling a series of print job procedures such as accepting the print job, analyzing the JDF, creating raster data, printing by a printer, etc. The RIP control means control in which, after creating the below-described "job attribute within DFE", "RIP Parameter List" is created to cause the RIP engine 59 to create the raster data. "RIP", which stands for "Raster Image Processor", means creating the raster data and a dedicated IC for creating the raster data. The printer control is control in which the printer is caused to transmit the raster data and a part (below called "Finishing information") of the "job attribute within DFE".

The DFE 32 includes a job receive unit 51, a system control unit 52, a UI control unit 54, a job control unit 55, a JDF analysis unit 56, an RIP unit 57, an RIP control unit 58, an RIP engine 59, and a printer control unit 61. These are implemented by the CPU 321 executing the programs 328 and cooperating with various hardware units including FIG. 4. Moreover, the DFE 32 includes an image storage unit 60 and a job data storage unit 53 that are built in the recording medium 331, the RAM 322, and the auxiliary storage apparatus 323.

The job receive unit 51 accepts the print job from the application 12, etc., via the network 3. As a log, a unique job number, an accepted date/time, a completed date/time, a status, etc., for example, are associated with the print job to record the associated results. Other than being input from the application 12, the print job may be input from a USB memory, etc. While it is assumed that the JDF be included in the print job according to the present embodiment, when the JDF is not included therein, the job receive unit 51 creates a dummy JDF to make it possible to carry out rendering.

The system control unit 52 stores the received print job in the job data storage unit 53, or outputs it to the job control unit 55. For example, when it is set in the DFE 32 that a print job is stored in advance in the job data storage unit 53, the system control unit 52 stores the print job in the job data storage unit 53. Moreover, when there is a description in the JDF as to whether the print job is to be stored in the job storage unit 53, for example, the description is followed.

Moreover, if a user performs an operation to display, on the display 330, content of the print job stored in the job data storage unit 53, the JDF is output from the job data storage unit 53 to the UI control unit 54. If the user changed the JDF, the UI control unit 54 accepts the changed content and the system control unit 52 stores again the changed JDF in the job data storage unit 53.

Moreover, upon accepting instructions to execute a print job from a user, the end user environment 1, or the process management unit 20, the print job stored in the job data storage unit 53 is output to the job control unit 55. Moreover, when a print time is set in the JDF, for example, the print job stored in the job data storage unit 53 is output to the job control unit 55 upon reaching the time.

The job data storage unit 53, which is thus a storage area for storing a print job, is provided in the recording medium 331 or the auxiliary storage apparatus 323 of the DFE 32. Moreover, it may also be provided in the storage apparatus on a network.

The UI control unit 54 interprets the JDF to display the content of the print job on the display 330. Moreover, the raster data created by the RIP engine 59 may be displayed on the display 330.

The UI control unit 54 includes an evaluation value calculation table setting unit 64. The evaluation value calculation table setting unit 64 is one example of the claimed "setting acceptance unit". The evaluation value calculation table setting unit 64 accepts setting of the below-described "conversion evaluation value calculation table" by the user. The user may directly operate the DFE 32 to set the "conversion evaluation value calculation table" and set "the conversion evaluation value calculation table" via the network. Therefore, the evaluation value calculation table setting unit 64 does not have to be in the UI control unit 54 as long as it is included in the DFE 32.

The job control unit 55 causes the RIP control unit 58 to create raster data and causes the printer control unit 61 to print it. More specifically, first it transmits the JDF of the print job to the JDF analysis unit 56 and outputs a JDF conversion request to the JDF analysis unit 56.

The JDF analysis unit 56 according to the present embodiment may determine that the RIP engine 59 which is expected to render the application which created the print job is included therein and may determine that it is not included therein. First, a case in which it determines that the RIP engine is included therein is described. It is assumed that the present embodiment includes the RIP engines 59 of Company A, Company B, and Company C therein.

The JDF analysis unit 56 obtains a JDF and a JDF conversion request from the job control unit 55. The JDF analysis unit 56 analyses the description of the JDF to determine a manufacturer of the application 12 which created the JDF. Determining the manufacturer of the application which created the JDF is almost synonymous with determining the RIP engine 59 which is expected to render the print job.

When the RIP engine 59 which is expected to render the application which created the print job is included therein, the JDF analysis unit 56 converts the JDF to "job attribute within DFE" that can be handled by the DFE 32 with a scheme using a conversion table 65 provided for the manufacturer of the application. In other words, as long as the DFE 32 has been created by Company C, it converts the JDF created by the application of not only Company C, but also of Company A or Company B to the "job attribute within DFE" that can be handled by the DFE 32 of Company C. The "job attribute within DFE" is one example of the claimed apparatus setting information.

When the RIP engine 59 which is expected to render the application which created the print job is not included therein, the JDF analysis unit 56 creates the "job attribute within DFE" using the conversion table 65 for Company A, the conversion table 65 for Company B, and the conversion table 65 for Company C.

Even when it is determined that the RIP engine 59 which is expected to render the application which created the print job is included therein, the JDF analysis unit 56 may create the "job attribute within DFE" using the respective conversion tables for Company A, for Company B, and for Company C. In this way, even when determination of the manufacturer of the application by the JDF analysis unit 56 is erroneous, the most suitable RIP engine 59 can be selected.

When creating the "job attribute within DFE", the JDF analysis unit 56 creates the below-described "pre- and post-conversion information" for each conversion table 65. As the conversion table 65 is provided for the respective RIP engines, the "pre- and post-conversion information" is created for each of the RIP engine of Company A, the RIP engine of Company B, and the RIP engine of Company C.

Then, the JDF conversion evaluation value calculation unit 62 compares a setting value of the JDF that is included in "the pre- and post-conversion information" and a setting value of the "job attribute within DFE" to calculate an evaluation value with reference to the conversion evaluation value calculation table 66 based on the comparison results. The larger the value of the evaluation value, the smaller the difference between that before and that after conversion by the conversion table 65 (the conversion evaluation value calculation table is created such that the smaller the difference the larger the evaluation value.)

A conversion evaluation value calculation table 66 is held for each RIP engine. This is because the conversion table 65 for creating the "job attribute within DFE" is created for each RIP engine. As described below, a JDF item is associated with a "job attribute within DFE" item in the conversion evaluation value calculation table 66. Even when the JDF item differs from application to application, the conversion evaluation calculation table 66 may be provided for each RIP engine to calculate an accurate evaluation value for each RIP engine.

A job-attribute-within-DFE selection unit 63 selects "job attribute within DFE" that has the largest evaluation value to output the selected results to the job control unit 55. Moreover, when the largest evaluation value is less than a threshold, rendering is stopped, so that the UI control unit displays a job stop display on the display 330.

When creating the "job attribute within DFE", the JDF analysis unit 56 sets "RIP control mode" to the "job attribute within DFE". While the "RIP control mode" is described below, the "RIP control mode" includes "Page Mode" and "Sheet Mode". It is investigated in advance as to whether the print job of the respective Companies is created in the "Page Mode" or "Sheet Mode". Thus, the manufacturer of the workflow application which created the JDF may be determined to also determine the "RIP control mode". In the present example, the DFE 32 is assumed to handle setting of intensive printing of the print job in the "Page Mode" (the Page Mode is default.)

As described above, the job control unit 55 which obtained the "job attribute within DFE" converts the "job attribute within DFE" and the PDL to "RIP Parameter List" and outputs the print job to the RIP control unit 58 in the form of the "RIP Parameter List". The "RIP Parameter List" is a set of information required to perform an RIP process in the RIP engine 59. The job control unit 55 determines instructions for the RIP process on the RIP engine 59 from information of the "RIP Parameter List". The instructions are called an RIP command.

In the "RIP Parameter List" is included the "RIP control mode". The RIP control unit 58 controls the RIP engine 59 according to the "RIP control mode". Thus, a sequence is determined according to the "RIP control mode".

"Page Mode": The RIP process is instructed for each page to create raster data integrated into one sheet.

"Sheet Mode": The RIP process is instructed for each portion of one page onto which multiple pages have already been integrated (that corresponds to each page portion before the integration) to create raster data.

The RIP unit 57, which includes the RIP control unit 58 and the RIP engine 59, creates raster data therewith. The RIP control unit 58 analyses information in the "RIP Parameter List" to determine the RIP engine 59 to be used from multiple of the RIP engines 59. Determination of the RIP engine includes that based on at least one item in the "RIP Parameter list" and that base on RIP engine identification information which is explicitly indicated in the "RIP Parameter List". For example, the RIP engine is determined based on the description of "xmlns: A="www.aaa.com/schema/aaa"" or of "xmlns: B="www.bbb.com/schema/bbb"" in the "RIP Parameter List". Moreover, when the job control unit explicitly indicates the RIP engine identification information in the "RIP Parameter List", for example, the RIP engine indicated by the RIP engine identification information is selected. The RIP control unit 58 refers to the "RIP Parameter List" to transmit the RIP command to the RIP engine 59 selected.

Moreover, when the "RIP control mode" is the "Sheet Mode", the RIP control unit 58 refers to the "RIP Parameter List" to output the RIP command to the RIP engine 59 according to the "Sheet Mode". In this way, the difference between the print jobs may be smoothed out.

The RIP engine 59, which is a rendering engine, creates raster data by rasterizing according to the RIP command.

The image storage unit 60 is a storage unit into which the created raster data are stored. The image storage unit 60 is installed in the auxiliary storage apparatus 323, for example. Alternatively, it may be installed in a storage apparatus on a network.

The printer control unit 61, which is connected to the printer 31, reads raster data stored in the image storage unit 60 and transmits the read results to the printer 31 to print the transmitted results. Moreover, it performs a finishing process based on "Finishing information" which is obtained from the job control unit 55.

The printer control unit 61 may communicate with the printer 31 using various communications standards and obtain printer information. For example, CIP4, which specifies standards of the printing workflow, specifies, as JDF standards, standards called DevCaps for transmitting/receiving device specification information with a printer. Moreover, a method of collecting printer information is also known using a communications protocol called SNMP (Simple Network Management Protocol) and a database called MIB (Management Information Base). The printer control unit 61 uses them to obtain various information sets stored in the printer. For example, the configuration of printer features (presence/absence of an ADF, presence/absence of a double-sided printing unit, a tray configuration, presence/absence of a manual feed tray, presence/absence of various finishers, etc.) may be obtained. Moreover, the status of the printer (during printing, during scanning, during FAX reception, during sleep, etc.) may be obtained. Moreover, a remaining amount of sheets in each tray may be obtained.

(Determination of Manufacturer of JDF and Application which Created the JDF)

The JDF is described in XML (Extensible Markup Language). The XML represents a standard of a structured text which provides meaning to a tag to structure a document.

FIGS. 6A to 6C are exemplary diagrams for explaining a part of descriptions of the JDF. The JDF in FIG. 6A is created by the application 12 of Company C. In the JDF is described instruction content for the print job.

"JDF xmlns="http://www.CIP4.org/JDFSchema_1_1"" indicates that it is a JDF ticket which is CIP4-compliant.

"xmlns: C="www.ccc.com/schema/ccc"" indicates a JDF tag definition which is extended proprietarily by the respective printing operators/vendors which do not comply with CIP4. For the present example, any tag which begins with "C:" within the JDF are all extension tags.

"Resource Pool" defines a set of attributes for realizing printing.

"LayoutPreparationParams", which is one of attributes defined in "the ResourcePool", defines an attribute related to layout.

"ResourceLinkPool" defines a collection of references to an attribute commonly used within "ResourcePool" for that range when the attribute differs in a certain range within a job such as between pages.

"Component Link", which is one of reference definitions within "ResourceLinkPool", specifies an attribute reference related to output matter and information thereof.

"Amount" specifies the number of copies.

"Rotate" specifies a rotation angle of an image.

FIG. 6B indicates one example of extension of Company A, while FIG. 6C indicates one example of extension of Company B. "xmlns: A="www.aaa.com/schema/aaa" in FIG. 6B means that all of tags which begin with "A:" within the JDF are to be extension tags of Company A. "xmlns: B="www.bbb.com/schema/bbb" in FIG. 6C means that all of tags which begin with "B:" within the JDF are to be extension tags of Company B.

Therefore, the JDF analysis unit 56 may refer to these descriptions of the JDF to determine a manufacturer of the application 12 which created the JDF. The below-described conversion table 65 in accordance with the manufacturer of the application 12 may be used to convert the JDF to "job attribute within DFE" that may be handled by the DFE 32 of Company C.

(Creation of Job Attribute within DFE)

Figure 8A:
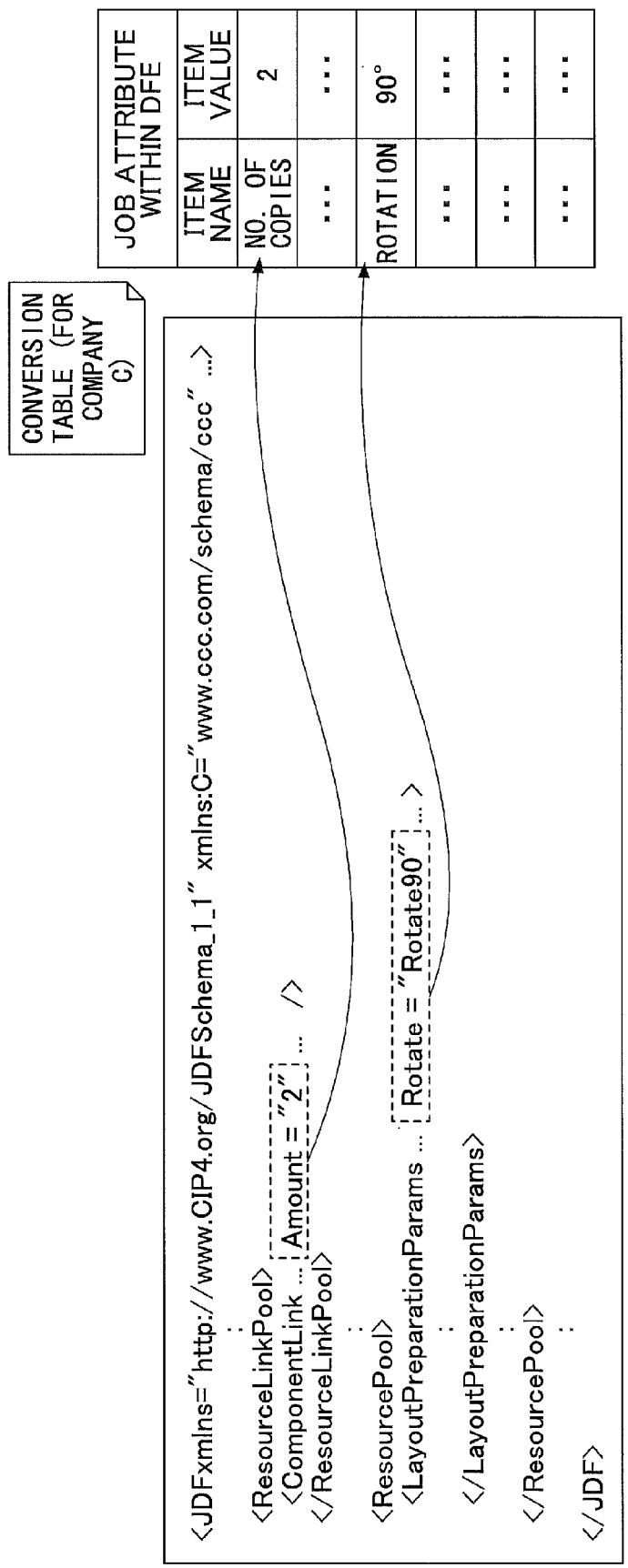
FIGS. 8A-8C are exemplary diagrams for explaining creation of "job attribute within DFE"
Figure 8B:
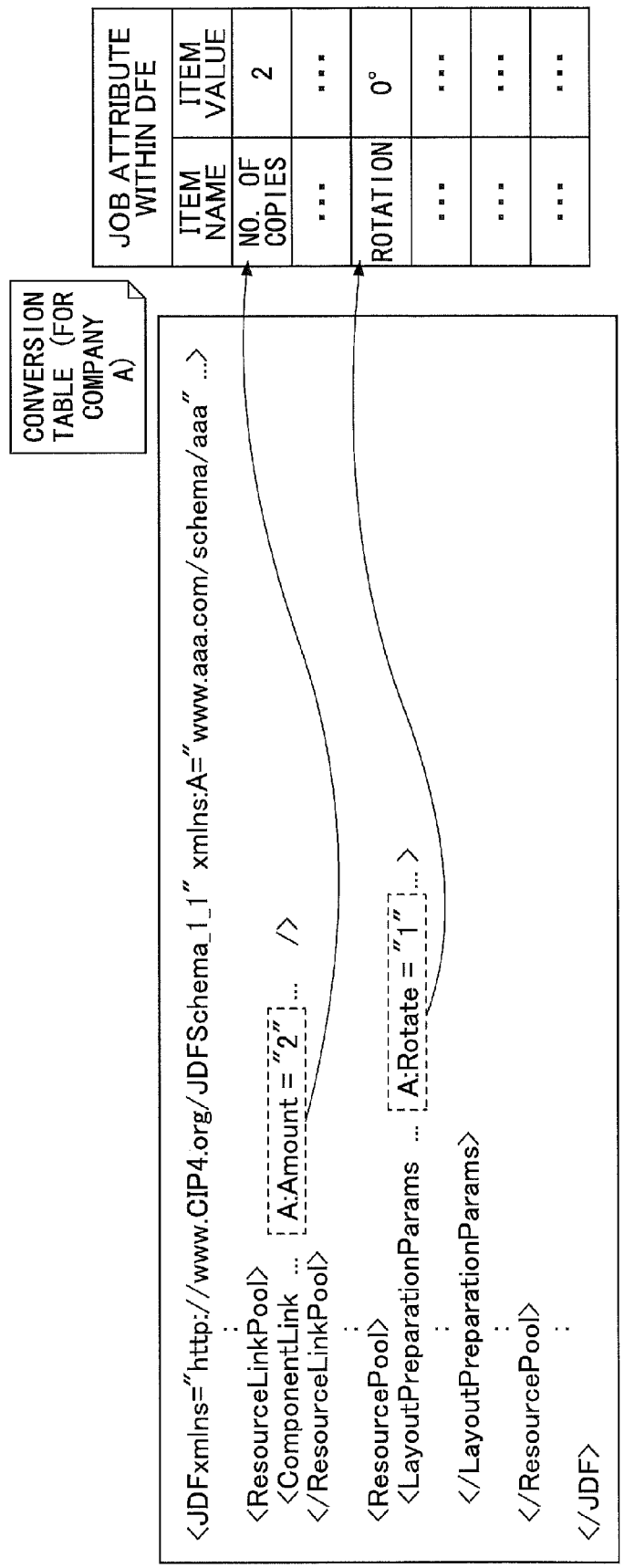
Figure 8C:
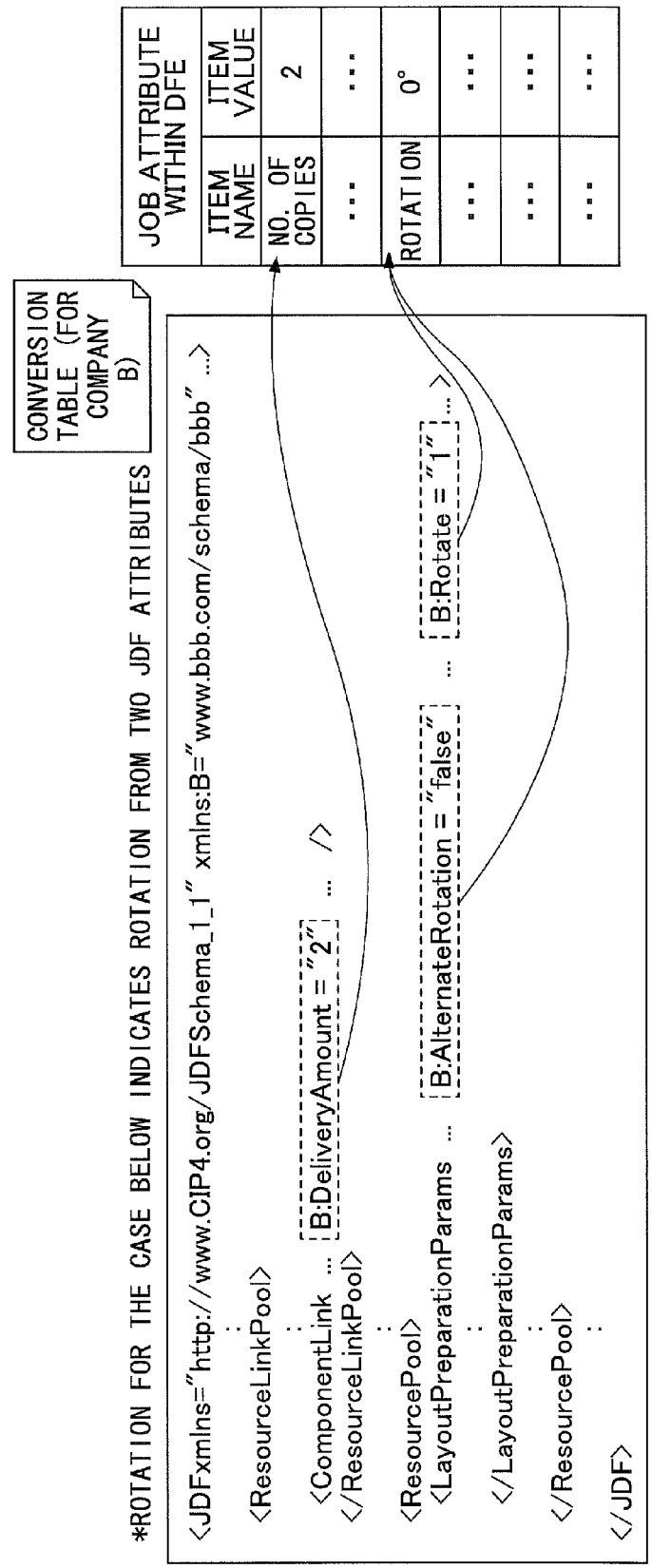

Creation of "job attribute within DFE" is described using FIGS. 7A-7C and FIGS. 8A-8C. FIGS. 7A-7C are examples of a conversion table, while FIGS. 8A-8C are examples of a diagram for describing creation of "job attribute within DFE". The JDF analysis unit 56 converts the JDF to the "job attribute within DFE" using a conversion table 65 of a manufacturer of the application 12 which created the JDF (the RIP engine which is expected to process the print job). When the manufacturer of the application 12 which created the JDF may not be determined, the JDF is converted to the "job attribute within DFE" using all of the conversion tables 65. Thus, the "job attribute within DFE" is created for all of the RIP engines.

FIG. 7A shows one example of a conversion table of Company C. The conversion table of Company C associates an attribute value of an attribute name called "Amount" to an item value of an item name called "the no. of copies" and an attribute value of an attribute name called "Rotate" to an item value of an item name called "rotation".

As illustrated in FIGS. 8A-8C, a conversion method is to refer to the conversion table 65 which associates the attribute within the JDF tag and the item of "job attribute within DFE" and arranges the attribute value of the JDF as the item value of "the job attribute within DFE".

The JDF analysis unit 56 holds in advance not only the conversion table of Company C, but also the conversion table of Company A and the conversion table of Company B. FIG. 7B indicates the conversion table of Company A, while FIG. 7C indicates the conversion table of Company B. As described above, the JDF analysis unit 56 detects a description which specifies an extension tag from the JDF to determine the manufacturer of the application 12 and uses the conversion table 65 corresponding to the respective manufacturers.

The JDF of Companies A and B may also be converted similarly. The conversion table of Company A associates an attribute value of an attribute name called "A: Amount" to an item value of an item name called "the no. of copies" and an attribute value of an attribute name called "Rotate" to an item value of an item name called "A: Rotate". The conversion table of Company B associates an attribute value of an attribute value of an attribute name called "B: DeliveryAmount" to an item value of an item name called "the no. of copies" and an attribute value of an attribute name called "B: Rotate" to an item value of an item name called "rotation". Rotation is enabled only when an attribute value of an attribute name called "B: AlternateRotation" is "false". Therefore, when it is determined to be a JDF of Company A or Company B, "job attribute within DFE" may be created in a manner similar to a case in which it is determined to be the JDF of Company C.

When it is determined that the format of a print job in intensive printing is created by the application 12 of a Company which is different from the own Company (Company C), the JDF analysis unit 56 sets "Sheet Mode" in an item called "RIP control mode" of "job attribute within DFE". When the application 12 is that manufactured by the own Company or the format of the print job in intensive printing is that of the application 12 of the same Company as the own Company (Company C), it sets "Page Mode" in the item called the "RIP control mode". In this way, the RIP control unit 58 may control an RIP command to be output to the RIP engine 59 according to the "RIP control mode".

FIG. 9 is a diagram illustrating one example of "a job attribute within DFE". "The job attribute within DFE" is largely categorized into "Job information" related to job execution, "Edit information" related to raster data, and "Finishing information" related to a finishing process.

The Job information includes an item called "no. of copies", which specifies the number of copies.

An item called "orientation information" of the Edit information specifies the printing orientation.

An item called "printing face information" of the Edit information specifies a printing face.

An item called "rotation" of the Edit information specifies a page rotation angle.

An item called "enlarge/reduce" of the Edit information specifies enlarge/reduce and the scaling ratio.

An item called "image position: offset" of the Edit information specifies an offset of an image.

An item called "image position: position adjustment information" of the Edit information specifies position adjustment of an image.

An item called "layout information: custom imposition arrangement" of the Edit information specifies custom face arrangement.

An item called "layout information: no. of pages" of the Edit information specifies the number of sheet pages.

An item called "layout information: imposition information" of the Edit information specifies information on face arrangement.

An item called "layout information: page order information" of the Edit information specifies information on the order of pages to be printed.

An item called "layout information: creep position adjustment" of the Edit information specifies information on creep position adjustment.

An item called "margin information" of the Edit information specifies information on margin such as fit box, gutter, etc.

An item called "crop mark information: center crop mark information" of the Edit information specifies information on center crop mark.

An item called "crop mark information: corner crop mark information" of the Edit information specifies information on corner crop mark.

An item called "Collate information" of the Finishing information specifies information on whether to print by page or by document when a multiple number of document copies are printed.

An item called "staple/bind information" of the Finishing information specifies information on staple/bind.

An item called "punch information" of the Finishing information specifies information on punching.

An item called "fold information" of the Finishing information specifies information on folding.

An item called "trim information" of the Finishing information specifies information on trimming.

An item called "output tray information" of the Finishing information specifies information on output trays.

An item called "input tray information" of the Finishing information specifies information input trays.

An item called "cover sheet information" of the Finishing information specifies information on cover sheets.

Moreover, as shown, "RIP control mode" is set in "job attribute within DFE". "Page Mode" or "Sheet Mode" is set in the "RIP control mode". For a dummy JDF, the "Page Mode" is to be set in "the RIP control mode".

(RIP Parameter List)

FIG. 10 is a diagram illustrating one example of "RIP Parameter List".

Input/output data type information specifies input and output data types. (For input and output data, not only PDL, but also image data such as JPEG, a text file, etc., are also specified.)

Input/output data read/write position specification scheme information specifies a method of specifying an offset (read/write position) of the input and output data. For example, it may specify "from a specified position"; "from the current position", "from the very end", etc.

Input/output data read/write position information specifies the current processing position of the input and output data.

Input/output data read/write execution mode information is information which specifies an execution mode. For example, it specifies READ, WRITE, READ WRITE, etc.

Unit information (dimension) specifies a unit which is used within "RIP Parameter List". For example, it specifies "mm", "inch", "pel", "point", etc.

Input/output data compression scheme information specifies a method of compressing the input and output data. For example, it specifies "UNCOMPRESSED", "PACKBITS", etc.

"RIP control mode" specifies a control mode in intensive printing. For example, it specifies "Page Mode" or "Sheet Mode".

Input/output image information unit includes "information related to output image", "information related to input image", and "information related to image handling".

Image format type specifies the type of output image format. For example, it specifies a raster, etc.

Image format dimension specifies the dimension of the output image format.

Image format resolution specifies the resolution of the output image format.

Image position specifies the output image position.

Color separation information specifies color separation (color decomposition). For example, it specifies "k", "cmyk", "separation", etc.

Color plane fit policy information specifies a color plane expansion scheme.

Plane shift information specifies a color plane shift amount.

No. of image format color bits specifies the number of output image format color bits.

Image orientation information specifies the orientation of an output image page.

Image formation position information specifies position information on a crop area.

Image formation size information specifies size information on the crop area.

Image formation scheme information specifies a clipping policy.

Color ICC information specifies information on a color ICC profile.

Font substitution information specifies information on font substitution.

Image formation base point information specifies an image formation starting point. For example, it specifies "center", "upper right", etc.

Flat k black information specifies information on flat k black.

Rendering information specifies information on rendering (rasterizing).

Image format type specifies the type of the input image format. For example, it specifies a raster, etc.

Image format dimension specifies the dimension of the input image format.

Image format resolution specifies the resolution of the input image format.

Image position specifies the input image position.

Input data specifies the input data.

Page range information specifies the page numbers.

Color ICC information specifies information on the color ICC profile.

Scaling offset information specifies an offset for the enlarge/reduce algorithm. For example, it specifies a horizontal offset, a vertical offset, etc.

Object area information specifies the width and height of an object area.

Halftone information specifies an offset for halftone. For example, it specifies a horizontal offset, a vertical offset, etc.

Scaling algorithm information specifies a scaling scheme.

Information related to PDL specifies data area, size information, and data arrangement method.

Data area specifies information on an area in which the PDL is stored. Font information, page no. information, etc., are included in the PDL, which resides within this data region.

Size information specifies a size of the PDL.

Data arrangement scheme specifies a data arrangement scheme. For example, it specifies little endian, big endian, etc.

(Conversion Evaluation Value Calculation Table)

FIGS. 11-14 are diagrams illustrating an exemplary conversion evaluation value calculation table. A conversion evaluation value calculation table 66 is set (for each RIP engine) in advance by a user for the respective conversion tables of Company A, B, and C through an evaluation value calculation table setting unit 64. In the conversion evaluation value calculation table 66 are associated "value within JDF", "converted DFE job attribute value", and "evaluation value" for each item shown in FIG. 9.

As described above, the "job attribute within DFE" is created to obtain the "converted DFE job attribute value" in FIGS. 11-14. "Value within JDF" is a description (an attribute value) within a JDF that is converted to "job attribute within DFE". This conversion evaluation value calculation table 66 provides "an evaluation value" for each item which "converted DFE job attribute value" the "value within JDF" is converted to.

For example, for the item called "the no. of copies", the evaluation value of "0" is provided when a value of "0-32768" in the JDF is converted to "0-32768" in the "job attribute within DFE", while the evaluation value of "−5" is provided when a value of "32768-" in the JDF is converted to "32768" therein. This evaluation value demonstrates that the smaller the difference between the attribute value of the JDF and the value of the "job attribute within DFE", the higher the "evaluation value".

Similarly, for the item called the "orientation information", the evaluation value of "0" is provided when a value of "Portrait" in JDF is converted to "Portrait" in "job attribute within DFE" or when a value of "Landscape" in the JDF is converted to "Landscape" in the "job attribute within DFE". The evaluation value of "−1" is provided when a value of "orientation type 1" in JDF is converted to "Portrait" therein or when what is "orientation type 2" in the JDF is converted to "Landscape" therein. The evaluation value of "−5" is provided when what is "orientation type 3" in the JDF is converted to "Portrait" therein.

Moreover, for the item called "Collate information" of the "Finishing information", the evaluation value of "0" is provided when a value of "None" in JDF is converted to "None" in "job attribute within DFE"; when a value of "Sheet" in JDF is converted to "Sheet" in the "job attribute within DFE"; or when a value of "SheetSetAndJob" in the JDF is converted to "SheetSetAndJob" in the "job attribute within DFE". The evaluation value of "−2" is provided when what is "Collate type 1" in JDF is converted to "None" therein or when what is "Collate type 3" in the JDF is converted to "SheetSetAndJob" therein. The evaluation value of is provided when a value of "Collate type 4" in JDF is converted to "None" therein or when what is "Collate type 5" in the JDF is converted to "None" therein.

(Calculation of Evaluation Value)

FIGS. 15 and 16 are exemplary diagrams for explaining calculation of an evaluation value in detail. FIG. 15 is a diagram illustrating the correspondence between "value within JDF" and "converted DFE job attribute value" for each item of "job attribute within DFE" for a certain JDF. FIG. 15 shows the above-described pre- and post-conversion information. The "value within JDF" is an exemplary claimed first setting value, while the "converted DFE job attribute value" is an exemplary claimed second setting value.

For "no. of copies", "orientation information", "rotation", "enlarge/reduce", "image position—offset", "image position—position adjustment information", "layout information—custom imposition arrangment", "layout information—no. of pages", "layout information—imposition information", "layout information—page order information", "layout information—creep position adjustment x", "margin information", "crop mark information—center crop mark information", "crop mark information—corner crop mark information", "Collate information", "staple/bind information", "punch information", "fold information", "trim information", "output tray information", "input tray information", and "cover sheet information", the "value within JDF" and the "converted DFE job attribute value" are the same.

Other than the above, for "printing face information" and "layout information—creep position adjustment y", the "value within JDF" and the "converted DFE job attribute value" differ.

The JDF conversion evaluation value calculation unit 62 provides an evaluation value of "0" when it refers to the conversion evaluation value calculation table to find that the "value within JDF" and the "converted DFE job attribute value" are the same. When the "value within JDF" and the "converted DFE job attribute value" differ, it refers to the conversion evaluation value calculation table 66 to read an evaluation value associated with the "value within JDF" and the "converted DFE job attribute value" and provides the evaluation value to the item.

FIG. 16 is a diagram illustrating one example of evaluation values provided to the "value within JDF" and the "converted DFE job attribute value" in FIG. 15. Other than the "printing face information" and the "layout information", the evaluation value is "0".

On the other hand, for "printing face information", the "value within JDF" is "front face single side" and the "converted DFE job attribute value" is "front face", so that an evaluation value of "−1" is provided according to the conversion evaluation value calculation table 66. Moreover, for "layout information-creep position adjustment y", the "value within JDF" is "y" and the "converted DFE job attribute value" is "CYa", so that an evaluation value of "−2" is provided according to the conversion evaluation value calculation table 66.

In this way, the evaluation value leads to obtaining an indicator on how accurate the JDF was converted to "job attribute within DFE". The job-attribute-within-DFE selection unit 63 totals the evaluation values for all of the items to select "job attribute within DFE" with the largest total value. Therefore, "job attribute within DFE" that is estimated to have the smallest difference between the "value within JDE" and the "converted DFE job attribute value" is output to the job control unit 55.

(Setting Conversion Evaluation Value Calculation Table)

The conversion evaluation value calculation table 66 may be set by a user. The user takes into account the importance of an item to set an evaluation value for each item. It is determined that, when there is a difference "value within JDF" and the "converted DFE job attribute value" differ, the importance of an item is generally higher for the item with the larger difference in raster data.

Moreover, in the raster data, an item related to modes (no. of copies, printing orientation, color tint, font, etc.) which are regarded as important by the user is determined to have a higher importance. For example, when there are some difficulties with the "no. of copies" differing, the evaluation value for "the no. of copies" is set to a large negative value when the "value with JDF" and the "converted DFE job attribute value" differ; otherwise, the evaluation value for "the no. of copies" is set to "0" or a value close thereto. Moreover, when there is some difficulty with the orientation of printing raster data differing, the evaluation value for the "orientation information" is set to a large negative value when "value with JDF" and "converted DFE job attribute value" differ; otherwise, the evaluation value for the "orientation information" is set to "0" or a value close thereto. In this way, the user may set an appropriate evaluation value in accordance with an objective of printing, etc.

A standard evaluation value is set in advance as an initial value in the conversion evaluation value calculation table 66. In this way, ease of use may be improved for the user, who does not have to set an evaluation value for all of the items.

Figure 17:
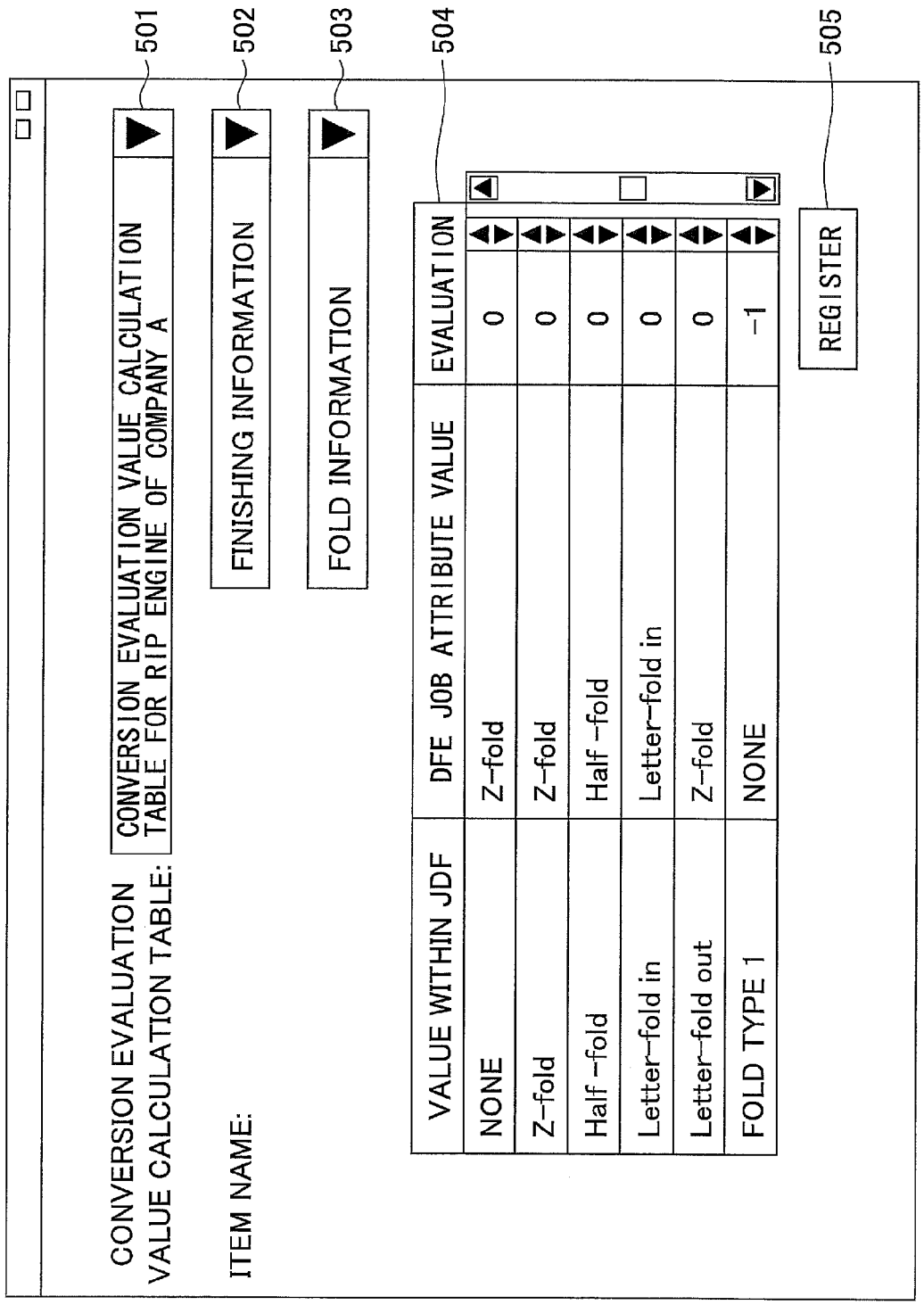
FIG. 17 is a diagram illustrating one example of an evaluation value setting screen which is displayed on a display.

FIG. 17 is a diagram illustrating one example of an evaluation value setting screen displayed on a display. The evaluation value setting screen includes a table selection column 501; item name columns 502 and 503; a table display column 504; and a register button 505. The table selection column 501 accepts a selection on which RIP engine 59 (application manufacturer) the conversion evaluation value calculation table 66 is set for. On the item name columns 502 and 503 is displayed an item name of the "job attribute within DFE", so that selection of the item by the user is accepted. Moreover, on the table display column 504 is displayed an evaluation value of the current conversion evaluation value calculation table 66.

When the user presses down the register button 505, the evaluation value calculation table setting unit 64 accepts the changed conversion evaluation value calculation table 66 and outputs the accepted results to the JDF conversion evaluation value calculation unit 62. This makes it possible for the JDF conversion evaluation value calculation unit 62 to hold the updated conversion evaluation value calculation table 66.

The evaluation value does not have "0" as a maximum, so that the larger numerical value which is greater than or equal to zero may be set for the smaller difference between the "value within JDF" and the "converted DFE job attribute value". In this case, the "job attribute within DFE" having the largest total of evaluation values as positive values is selected. Moreover, the evaluation value with the smaller absolute value may be set for the smaller difference between the "value within JDF" and the "converted DFE job attribute value". In this case, the "job attribute within DFE" having the smallest total of evaluation values as positive values is selected.

Furthermore, the DFE 32 may be accessed from an arbitrary PC for the user to set the conversion evaluation value calculation table 66. In this case, as a server, the DFE 32 transmits, to the PC, an evaluation value setting screen described in HTML or JavaScript (registered trademark). The user operates the PC to set the evaluation value and transmits the evaluation value setting screen to the DFE 32.

Figure 18:
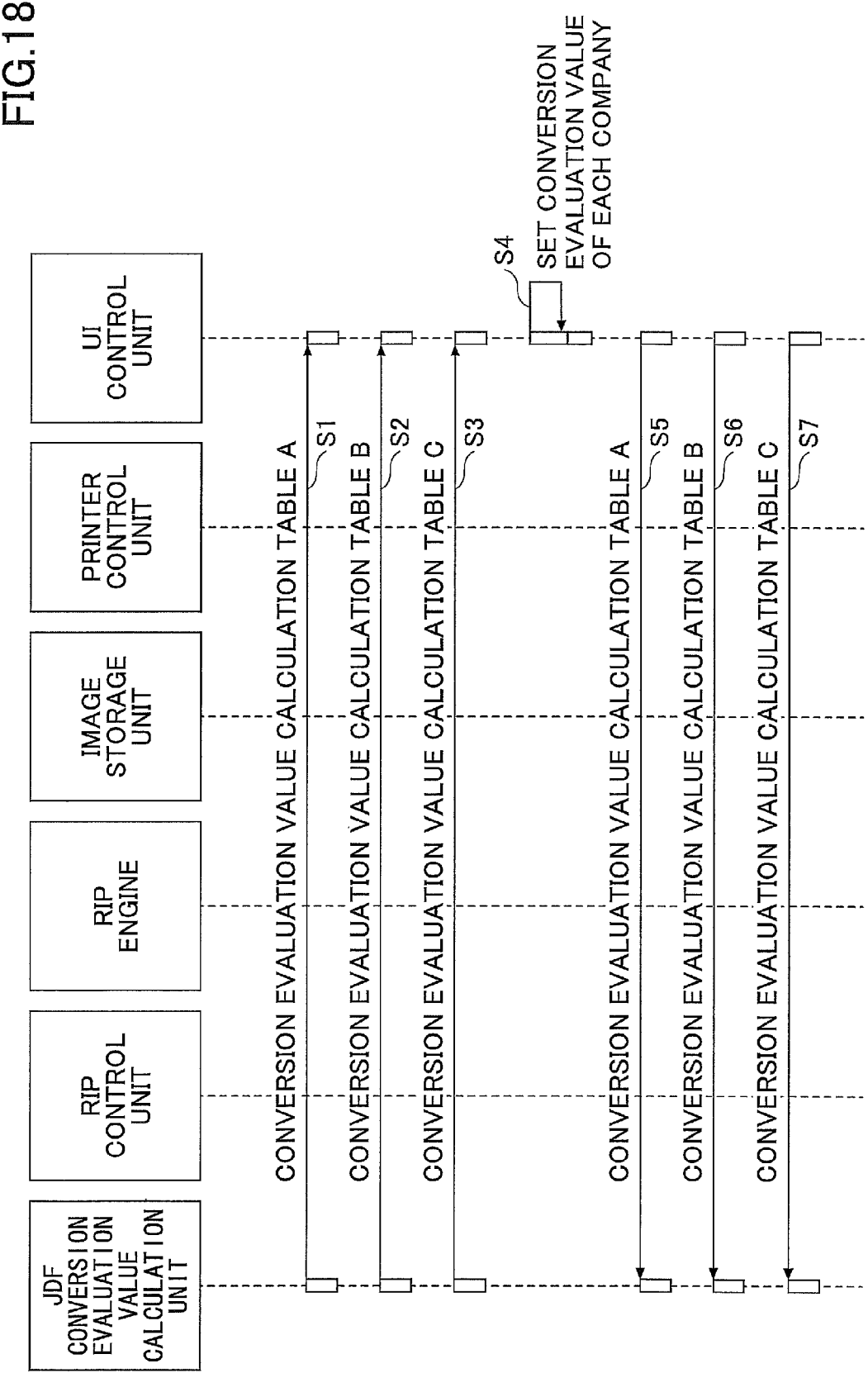
FIG. 18 is an exemplary sequence diagram indicating a procedure for a user to set up an evaluation value calculation table.

FIG. 18 is an exemplary sequence diagram indicating a procedure for a user to set up an evaluation value calculation table. The user operates the DFE 32 to cause a UI control unit to display an evaluation value setting screen.

S1: The UI control unit 54 reads a conversion evaluation value calculation table of Company A from the JDF conversion evaluation value calculation unit 62.

S2: The UI control unit 54 reads a conversion evaluation value calculation table of Company B from the JDF conversion evaluation value calculation unit 62.

S3: The UI control unit 54 reads a conversion evaluation value calculation table of Company C from the JDF conversion evaluation value calculation unit 62.

S4: The user selects the conversion evaluation value calculation table 66 of Company A-C to set an evaluation value to the conversion evaluation value calculation table 66. The evaluation value calculation table setting unit 64 accepts setting of the evaluative value.

S5: For example, when the user presses down the register button 505, the evaluative value calculation table setting unit 64 outputs the conversion evaluation value calculation table 66 of Company A to the JDF conversion evaluation value calculation unit 62.

S6: The UI control unit 54 outputs the conversion evaluation value calculation table 66 of Company B to the JDF conversion evaluation value calculation unit 62.

S7: The UI control unit 54 outputs the conversion evaluation value calculation table 66 of Company C to the JDF conversion evaluation value calculation unit 62.

With the process described above, the JDF conversion evaluation value calculation unit 62 holds the conversion evaluation value calculation table 66 of Company A-C that are set by the user.

(Job Stop Displaying)

The total of evaluation values calculated from the three "job attributes within DFE" may become so small (the absolute value taking a large negative value) that neither of them are considered to be not suitable for printing. In this case, it is considered that printing should not be performed, so that, when the maximum value of the total evaluation values of the three "job attributes within DFE" is less than a threshold, the JDF conversion evaluation value calculation unit 62 requests the UI control unit 54 to perform job stop displaying.

Figure 19:
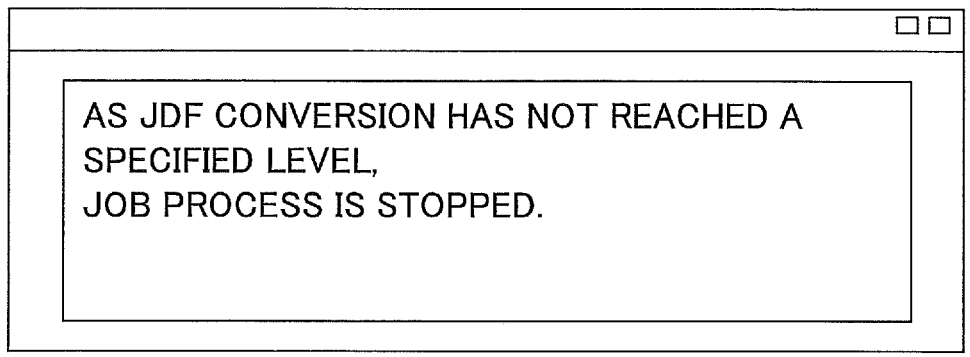
FIG. 19 is a diagram illustrating one example of a job stop display which is displayed on the display.

FIG. 19 is a diagram illustrating one example of a job stop display which is displayed on a display 330 (which is one example of the claimed display unit). FIG. 19 includes a display that "as JDF conversion has not reached a specified level, job process is stopped". This makes it possible for the user to grasp that the print job is not to be output.

Moreover, if the print job is transmitted from a client PC, it is preferable that the DFE 32, not only provides displaying onto the display 330, but also transmits the job stop display to the client PC (or that the DFE 32 transmits the job stop display to the client PC without providing displaying to the display 330). This makes it possible for the user who operates a client PC at a remote location to grasp that the print job is not to be output. The DFE 32 may store an IP address of the client PC when the print job is received, for example, and transmit the job stop display to the IP address.

Operation Procedure

Figure 20:
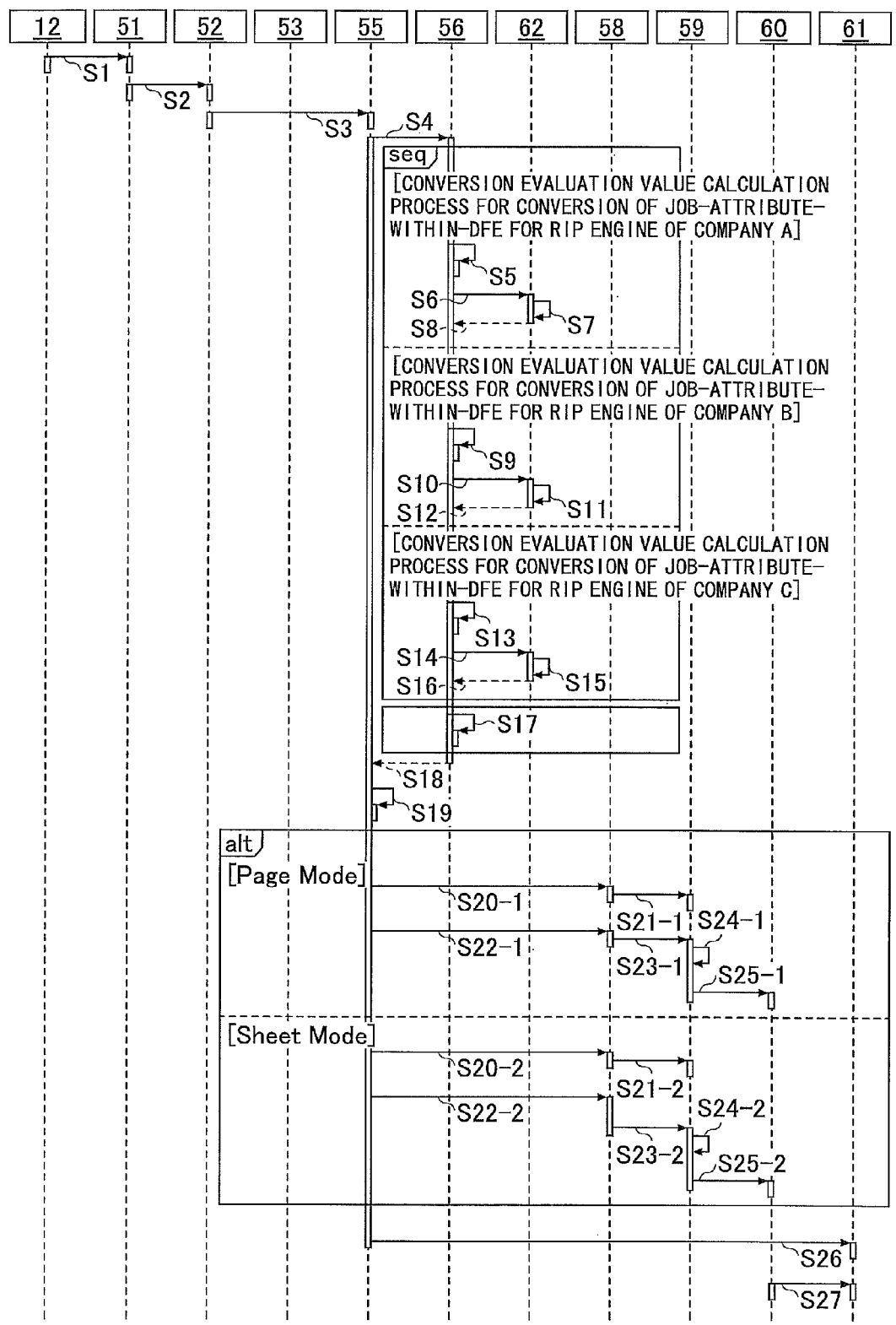
FIG. 20 is an exemplary sequence diagram illustrating an operation procedure of the printing system.

FIG. 20 is an exemplary sequence diagram illustrating an operation procedure of the printing system 200.

S1: The application 12 transmits a print job (JDF+PDL) to the DFE 32.

S2: The job receive unit 51 outputs the print job (JDF+PDL) to the system control unit 52.

S3: The system control unit 52 outputs the print job to the job control unit 55. When the DFE 32 is set so as to store the print job in the job data storage unit 53, the system control unit 52 stores the print job in the job data storage unit 53.

S4: The job control unit 55 outputs the JDF and the JDF conversion request to the JDF analysis unit 56.

S5: When the application which created the JDF cannot be specified, the JDF analysis unit 56 creates "job attribute within DFE" according to all of the conversion tables 65 that are provided for the respective RIP engines. As described above, even if the application which created the JDF cannot be specified, the "job attribute within DFE" may be created according to all of the conversion tables 65. First, the JDF analysis unit 56 uses the conversion table for converting the JDF created by the application of Company A to the "job attribute within DFE" to convert the JDF to the "job attribute within DFE". Then, the pre- and post-conversion information A is created.

S6: The JDF analysis unit 56 requests the JDF conversion evaluation value calculation unit 62 to calculate the evaluation value with the pre- and post-information A.

S7: The JDF conversion evaluation value calculation unit 62 uses the pre- and post-conversion information A to refer to the conversion evaluation value calculation table 66 and calculate the evaluation value A.

S8: The JDF conversion evaluation value calculation unit 62 outputs the evaluation value A to the JDF analysis unit 56.

S9: The JDF analysis unit 56 uses the conversion table 65 for converting the JDF created by the application of Company B to the "job attribute within DFE" to convert the JDF to the "job attribute within DFE". Then, the pre- and post-conversion information B is created.

S10: The JDF analysis unit 56 requests the JDF conversion evaluation value calculation unit 62 for the pre- and post-information and calculation of the evaluation value.

S11: The JDF conversion evaluation value calculation unit 62 uses the pre- and post-conversion information B to refer to the conversion evaluation value calculation table 66 and calculate the evaluation value B.

S12: The JDF conversion evaluation value calculation unit 62 outputs the evaluation value B to the JDF analysis unit 56.

S13: The JDF analysis unit 56 uses the conversion table 65 for converting the JDF created by the application of Company C to the "job attribute within DFE" to convert the JDF to the "job attribute within DFE". Then, the pre- and post-conversion information C is created.

S14: The JDF analysis unit 56 requests the JDF conversion evaluation value calculation unit 62 for the pre- and post-information C and calculation of the evaluation value.

S15: The JDF conversion evaluation value calculation unit 62 uses the pre- and post-conversion information C to refer to the conversion evaluation value calculation table 66 and calculate the evaluation value C.

S16: The JDF conversion evaluation value calculation unit 62 outputs the evaluation value C to the JDF analysis unit 56.

S17: The job-attribute-within-DFE selection unit 63 selects the "job attribute within DFE". In other words, the highest of the evaluation values A-C is selected and, when the selected result is at least the threshold, the "job attribute within DFE" with the highest evaluation value is selected. If it is less than the threshold, it requests the UI control unit 54 to display the job stop display.

Calculations of evaluation values A, B, and C do not have to be performed in the order shown, and, moreover, may be performed in parallel in time.

S18: The JDF analysis unit 56 outputs the "job attribute within DFE" that is selected by the job-attribute-within-DFE selection unit 63 to the job control unit 55.

S19: The job control unit 55 uses the "job attribute within DFE" and the PDL to create "RIP Parameter List".

The process below varies depending on whether "the RIP control mode" is "Page Mode" or "Sheet Mode". First, a case of "Page Mode" is described.

S20-1: The job control unit 55 outputs "RIP Parameter List" to the RIP control unit 58.

S21-1: The RIP control unit 58 initializes the RIP engine 59.

S22-1: The job control unit 55 makes an RIP execution request to the RIP control unit 58.

S23-1: The RIP control unit 58, instead of the job control unit 55, outputs the RIP command. When the "RIP control mode" is "Page Mode", the RIP control unit 58 outputs the RIP command in a sequence suitable for the "Page Mode".

S24-1: The RIP engine 59 performs rasterizing.

S25-1: The RIP engine 59 stores raster data in the image storage unit 60.

Next, a case of "Sheet Mode" is described.

S20-2: The job control unit 55 outputs "RIP Parameter List" to the RIP control unit 58.

S21-2: The RIP control unit 58 initializes the RIP engine 59.

S22-2: The job control unit 55 makes an RIP execution request to the RIP control unit 58.

S23-2: The RIP control unit 58, instead of the job control unit 55, outputs the RIP command. When the "RIP control mode" is "Sheet Mode", The RIP control unit 58 outputs the RIP command in a sequence suitable for the "Sheet Mode".

S24-2: The RIP engine 59 performs rasterizing.

S25-2: The RIP engine 59 stores raster data in the image storage unit 60.

Therefore, there is no difference between the "Page Mode" and the "Sheet Mode" for the operation of the job control unit 55 (which always operates according to "Page Mode"), so that the RIP control unit 58 may determine the difference between the "Page Mode" and the "Sheet Mode" based on the "RIP control mode" to smooth out the difference between the "Page Mode" and the "Sheet Mode".

S26: The job control unit 55 outputs the "Finishing information" and the printing execution request to the printer control unit 61. This timing may be before or after creation of the raster data.

S27: Upon obtaining the printing execution request, the printer control unit 61 checks the raster data of the image storage unit 60 and prints the checked results.

As described above, the DFE 32 according to the present example makes it possible to select an RIP engine 59 whose finished quality is expected to be closest to the finished quality intended by the user even when the DFE 32 does not have the RIP engine 59 which is expected to be used in rendering the print job. Moreover, as the print job is created by an unknown workflow application, it is possible to print it even when it is expected that there is some difference from the finished quality intended by the user.

Moreover, when calculating the evaluation value for all of the JDFs, a preferable RIP engine may be selected without determining a manufacturer of the workflow application which created the JDF (and eliminating the possibility of erring on the determination).

EXAMPLE 2

While the evaluation value is calculated from the JDF only in Example 1, a DFE 32 which calculates the evaluation value, taking into account the features of the printer 31, is described according to the present Example.

When the printer 31 is connected to the DFE 32, the printer control unit 61 may obtain a configuration of the features (presence/absence of various finishers) from the printer 31. In other words, whether it includes "collate function", "staple/bind function", "punch function", "fold function", "trim function", etc., may be detected.

When it does not include these features, the evaluation value based on the "value within JDF" and the "converted DFE job attribute value" that are related to these features are not affected by the printed matter. In other words, the order of multiple total evaluation values of the "job attribute within DFE" being affected by these features could cause the job-attribute-within-DFE selection unit 63 to select the "job attribute within DFE" that is not suitable due to the features not affecting the printed matter.

Thus, as described below, the JDF conversion evaluation value calculation unit 62 calculates the evaluation value while taking into account the features of the printer 31.

In the present Example, the constituting elements with the same letters in FIG. 5 serve the same function, so that only major constituting elements of the present example may be described mainly.

FIGS. 21A-21C are examples of a diagram for explaining calculation of an evaluation value which take into account the features of the printer 31. FIG. 21A illustrates pre- and post-conversion information only for "Finishing information". According to the above, the "value within JDF" and the "converted DFE job attribute value" differ for "punch information", "fold information", and "trim information".

FIG. 21B is one example of a diagram which describe the features of the printer 31. As shown, the printer control unit 61 obtains printer features information from the printer 31 and outputs the obtained results. It is seen here that the printer 31 does not have the "trim function".

FIG. 21C illustrates exemplary calculation of the evaluation value. For the purpose of explanations, evaluation values for a case in which the features are not taken into account and for a case in which the features are taken into account are respectively shown. For the case in which the features are not taken into account, an evaluation value of "−1" is provided in "pinch information" according to the conversion evaluation value calculation table 66; an evaluation value of "−1" is provided in "fold information" according to the conversion evaluation calculation table 66; and an evaluation value of "−5" is provided in "trim information" according to the conversion evaluation calculation table 66.

On the other hand, when the features are taken into account, "trim information" does not affect the printed matter, so that it does not have to be evaluated. Therefore, the JDF conversion evaluation value calculation unit 62 provides an evaluation value of to the "trim information". A symbol other than a numerical value, such as "−", as opposed to "0", may be provided thereto.

Therefore, the total evaluation value is "−7" when the evaluation value is not taken into account is "−7", while it is "−2" when the evaluation value is taken into account. The total evaluation values differ by "−5" between when the evaluation value is taken into account and when it is not taken into account.

Even when calculating the evaluation value for the other "DFE job attribute", the evaluation value of "trim information" of "0" is the same. However, the user can set an evaluation value in the conversion evaluation calculation table that varies from one RIP engine to another, so that the magnitude of the effect of taking into account the features vary from one RIP engine 59 to another.

For example, assume that there is a conversion evaluation value calculation table for which the evaluation value in the conversion evaluation value calculation table is "−5" when the "value within JDF" is "bind type 1" and the "converted DFE job attribute value" is "none" in the "punch information" (the same as in FIG. 21C otherwise). In this case, the total evaluation value is "−11" when the features are not taken into account and "−2" otherwise.

Therefore, it becomes highly likely for the "DFE job attribute" described in FIG. 21C to be selected when the features are not taken into account, while which "DFE job attribute" is selected may vary depending on the evaluation value of items other than the "Finishing information" otherwise. Thus, the features of the printer 31 is taken into account to eliminate the possibility of totaling the evaluation value for which there is not item corresponding to the features, making it easier to select the RIP engine 59 which is suitable for a JDF created by an unknown application.

Therefore, the present Example takes into account the features of the printer 31 to calculate the evaluation value, making it easier to select the RIP engine 59 which is suitable for a JDF created by an unknown application.

(Preferable Variations)

While the foregoing described best modes for carrying out the present invention using Examples, the present invention is not whatsoever limited to the Examples, so that variations and replacements may be applied without departing from the scope of the gist of the present invention.

For example, while the DFE 32 includes all of the functions in FIG. 5, these respective functions may be arranged in different apparatuses which can communicate via a network. For example, the RIP engine 59 and the JDF analysis unit 56 of the respective Companies may reside on a network which can be accessed by the DFE 32.

The same applies to the image storage unit 60 and the job data storage unit 53, so that they may reside on a network which can be accessed by the DFE 32.

Moreover, the JDF conversion evaluation value calculation unit 62 may reside externally to the DFE 32. In this case, the DFE 32 transmits pre- and post-conversion information to the external JDF conversion evaluation value calculation unit 62 and obtains an evaluation value from the JDF conversion evaluation value calculation unit 62. Setting of the conversion evaluation value calculation table 66 is performed on the JDF conversion evaluation value calculation unit 62, which is external to the DFE 32.

The present application is based on and claims the benefit of priority of Japanese Priority Application No. 2014-020232 filed on Feb. 5, 2014 and Japanese Priority Application No. 2015-18135 filed on Feb. 2, 2015, the entire contents of which is hereby incorporated by reference.

The invention claimed is:

1. An information processing apparatus which creates rendering data using a print job including print data and a setting information set, comprising:
   a conversion unit which converts the setting information set to an apparatus setting information set by multiple schemes, the apparatus setting information set to be handled by the information processing apparatus;
   an evaluation value determination unit which determines an evaluation value of the apparatus setting information set for the respective schemes based on results of comparing the setting information set and the apparatus setting information set; and
   a rendering data creation unit which creates rendering data using the print data and the apparatus setting information set converted by the scheme with the evaluation value higher than the other evaluation values.

2. The information processing apparatus as claimed in claim 1, including the rendering data creation unit in a multiple number, wherein
   the conversion unit is to convert the setting information set to the apparatus setting information set by the scheme using a conversion table provided for the respective rendering data creation units; wherein
   the evaluation value determining unit determines the evaluation value for the respective rendering data creation units; and wherein
   the rendering data creation unit with the evaluation value higher than that of any other rendering data creation unit creates the rendering data using the print data and the apparatus setting information set which was converted from the setting information set using the conversion table provided for the rendering data creation unit.

3. The information processing apparatus as claimed in claim 2, wherein
   the conversion unit is to detect a description for determining the rendering data creation unit that is described in the setting information set to select the conversion table, and convert the setting information set to the apparatus setting information set using the selected conversion table; and wherein,
   when the description for determining the rendering data creation unit cannot be detected, the conversion unit converts the one setting information set to the apparatus setting information set in a multiple number using all of the conversion tables.

4. The information processing apparatus as claimed in claim 3, wherein
   the conversion unit is to convert a first setting value to a second setting value for an item of the apparatus setting information set for the respective items of the setting information set, wherein
   the evaluation value determination unit provides a numerical value which is higher the closer the first setting value of the setting information set and the second setting value of the apparatus setting information set for the respective items of the apparatus setting information set and determines a total numerical value of the respective items as an evaluation value of the rendering data creation unit.

5. The information processing apparatus as claimed in claim 4, further including an evaluation value calculation table created in advance in correspondence with the respective rendering data creation units, the numerical value being associated with the first setting value and the second setting value, wherein
   the evaluation value determination unit, for the respective items of the apparatus setting information set, reads the numerical value which is associated with the first setting value and the second setting value of the evaluation value calculation table to provide the numerical value, and determines the total numerical value as the evaluation value of the rendering data creation unit.

6. The information processing apparatus as claimed in claim 5, further including a setting acceptance unit which accepts setting of the numerical value for the respective items of the apparatus setting information set for the evaluation value calculation table of the respective rendering data creation units, wherein
the evaluation value determination unit determines the evaluation value of the rendering data creation unit using the evaluation value calculation table whose setting of the numerical value was accepted by the setting acceptance unit.

7. The information processing apparatus as claimed in claim 4, further including a feature information obtaining unit which obtains, from a printer connected to the information processing apparatus, feature information of the printer, wherein
the evaluation value determination unit provides the numerical value only for the item of the apparatus setting information set that corresponds to a feature held by the printer based on the feature information, and determines the total numerical value of the respective items as the evaluation value of the rendering data creation unit.

8. The information processing apparatus as claimed in claim 1, further including a conversion failure display unit which displays that printing is to be stopped when the evaluation value which is the highest of the multiple evaluation values determined by the evaluation value determination unit is less than a threshold.

9. An information processing method of creating rendering data using a print job including print data and a setting information set, the information processing method comprising the steps of:
a conversion unit converting the setting information set to an apparatus setting information set by multiple schemes, the apparatus setting information set to be handled by an information processing apparatus;
an evaluation value determination unit determining an evaluation value of the apparatus setting information set for the respective schemes based on results of comparing the setting information set and the apparatus setting information set; and
a rendering data creation unit creating rendering data using the print data and the apparatus setting information set converted by the scheme with the evaluation value higher than the other evaluation values.

10. A non-transitory storage medium having recorded thereon a computer-readable program, which causes an information processing apparatus which creates rendering data using a print job including print data and a setting information set to execute the steps of:
converting the setting information set to an apparatus setting information set by multiple schemes, the apparatus setting information set to be handled by the information processing apparatus;
determining an evaluation value of the apparatus setting information set for the respective schemes based on results of comparing the setting information set and the apparatus setting information set; and
creating rendering data using the print data and the apparatus setting information set converted by the scheme with the evaluation value higher than the other evaluation values.

* * * * *